US011092752B2

(12) United States Patent
Li

(10) Patent No.: US 11,092,752 B2
(45) Date of Patent: Aug. 17, 2021

(54) OUTDOOR OPTICAL FIBER CONNECTION ASSEMBLY

(71) Applicant: SHENZHEN FIBERCAN OPTICAL CO., LTD, Guangdong (CN)

(72) Inventor: Yaole Li, People's Repulic of China (CN)

(73) Assignee: SHENZHEN FIBERCAN OPTICAL CO., LTD, Shenzhen (CN)

( * ) Notice: Subject to any disclaimer, the term of this patent is extended or adjusted under 35 U.S.C. 154(b) by 0 days.

(21) Appl. No.: 16/835,197

(22) Filed: Mar. 30, 2020

(65) Prior Publication Data

US 2020/0225423 A1 Jul. 16, 2020

Related U.S. Application Data

(63) Continuation-in-part of application No. PCT/CN2018/113983, filed on Nov. 5, 2018.

(30) Foreign Application Priority Data

Oct. 18, 2018 (CN) .......................... 201811216847.8
May 28, 2019 (CN) .......................... 201920804446.8

(51) Int. Cl.
*G02B 6/38* (2006.01)

(52) U.S. Cl.
CPC ......... *G02B 6/3825* (2013.01); *G02B 6/3826* (2013.01); *G02B 6/3849* (2013.01);
(Continued)

(58) Field of Classification Search
None
See application file for complete search history.

(56) References Cited

U.S. PATENT DOCUMENTS

| 7,399,125 B1* | 7/2008 | Whaley | G02B 6/4204 385/88 |
| 2009/0148101 A1* | 6/2009 | Lu | G02B 6/3849 385/56 |

(Continued)

FOREIGN PATENT DOCUMENTS

| CN | 201845109 U | 5/2011 |
| CN | 104007515 A | 8/2014 |

(Continued)

OTHER PUBLICATIONS

International Search Report and Written Opinion dated Jul. 5, 2019, to PCT Application No. PCT/CN2018/113983. [BAI-0200-PCT].

*Primary Examiner* — Michael Stahl
(74) *Attorney, Agent, or Firm* — Spectrum IP Law Group LLC

(57) ABSTRACT

Disclosed is an outdoor optical fiber connection assembly, including an SC optical fiber connector, an LC optical fiber connector, and an optical fiber adapter for communicatively connecting the SC optical fiber connector with the LC optical fiber connector. In the connection assembly of the disclosure, the optical fiber connector and the optical fiber adapter are respectively provided with an elastic member, so that they are tightened under a pre-tightening force after connected. Furthermore, by arranging multiple sealing structures at connection positions of the connection assembly, the sealing performance of the connecting components is enhanced. By improving the internal structure of the optical fiber connector, the stop ring cannot rotate after being assembled, which has a good circumferential positioning effect, can prevent internal core wires from twisting, has a high quality in optical fiber docking, is not prone to displace the optical fibers after docking, and is high in reliability.

20 Claims, 17 Drawing Sheets

(52) U.S. Cl.
CPC ......... *G02B 6/3869* (2013.01); *G02B 6/3887* (2013.01); *G02B 6/3894* (2013.01)

(56) References Cited

U.S. PATENT DOCUMENTS

| | | | |
|---|---|---|---|
| 2010/0061681 A1* | 3/2010 | Powell | G02B 6/3893 385/56 |
| 2014/0355936 A1* | 12/2014 | Bund | G02B 6/3802 385/81 |
| 2016/0252685 A1* | 9/2016 | Carapella | G02B 6/3897 385/87 |
| 2019/0235179 A1* | 8/2019 | Takano | G02B 6/3821 |
| 2020/0012050 A1* | 1/2020 | Takano | G02B 6/406 |

FOREIGN PATENT DOCUMENTS

| | | |
|---|---|---|
| CN | 104316998 A | 1/2015 |
| CN | 204154942 U | 2/2015 |
| CN | 106873088 A | 6/2017 |

\* cited by examiner

OUTDOOR OPTICAL FIBER CONNECTION ASSEMBLY

The disclosure is a bypass continuation and Continuation-In-Part (CIP) of PCT Application No. PCT/CN2018/113983 ("the '983 application) filed Nov. 5, 2018. The application claims priority to the '983 application as well as to Chinese Application No. 20192080446.8, filed May 28, 2019. The '983 application claims priority to Chinese Application No. 201811216847.8 field Oct. 18, 2018. The disclosure of each of the enumerated applications is incorporated herein in its entirety.

TECHNICAL FIELD

The disclosure relates to the technical field of optical fiber connection structures, in particular to an outdoor optical fiber connection assembly.

BACKGROUND

In optical communication systems, it is usually necessary to connect one optical fiber to another to realize communication, which needs to be carried out by using an optical fiber connection assembly. For optical communication systems used outdoors, it is often necessary to convert optical fiber signals of different modes. The outdoor optical fiber adapter, as a device for optical cable connection and switching, plays an important role in enabling light energy output by a transmitting optical fiber to be maximally transferred into a receiving optical fiber. The stability is low for connection of the existing SC connector with the LC connector, which is prone to disconnect. Due to the fact that the apparatus for manufacturing an optical fiber connection assembly cannot meet the requirement of high precision, connection by the optical fiber connection assembly has a poor tightness, resulting in risks such as signal interference and rainwater infiltration at connection positions of the optical fibers in an optical communication system. Furthermore, the optical fiber connector and the optical fiber adapter have the following drawbacks with respect to their own structural designs.

Product of the existing outdoor optical fiber adapter is difficult to assemble, with a multiplied cost due to a low production efficiency of the product. The Product has a low precision and poor quality due to the assembly clearance after assembled. There exists a large signal loss when the adapter is inserted oppositely into and matched with the optical fiber connector, resulting in a low reliability.

For the existing outdoor optical fiber adapter, axial positioning effect for the optical fiber connection is poor due to the fact that the core wire is prone to rotate around an axis, and quality in docking between fiber cores is poor, resulting in a low reliability.

There is therefore a need to technically improve the structures of existing optical fiber connector and adapter, and structure for connection thereof.

SUMMARY

To overcome the deficiencies in the prior art, the disclosure is intended to provide an outdoor optical fiber connection assembly.

The technical solutions for solving the technical problems of the disclosure are provided as follows.

There is provided an outdoor optical fiber connection assembly, including an SC optical fiber connector, an LC optical fiber connector, and an optical fiber adapter for communicatively connecting the SC optical fiber connector with the LC optical fiber connector. The optical fiber adapter is provided at opposite ends respectively with an SC connecting end and an LC connecting end which are correspondingly connected with the SC optical fiber connector and the LC optical fiber connector. The SC optical fiber connector is provided with an internal insertion channel for inserting and mounting an optical cable, a ferrule assembly for communication with the optical cable at one end of the SC optical fiber connector, a white inner core arranged on a periphery of the ferrule assembly for inserting into and circumferentially positioning the SC connecting end, and a locking sleeve on a periphery of the SC optical fiber connector which is configured for removable connection with the optical fiber adapter and has one end with an SC external thread. The SC connecting end of the optical fiber adapter is provided with a first through hole which is configured for insertion of the ferrule assembly and communication of the SC connecting end with the LC connecting end, a clamping seat for snap-fit connection with and circumferential positioning the white inner core, and an SC internal thread matched with the SC external thread, wherein a square positioning structure is adopted for the white inner core and the clamping seat.

In the disclosure, the SC optical fiber connector is further provided with: a front frame sleeve, within which the white inner core is mounted, arranged on a periphery of the SC connecting end, the ferrule assembly having a head for insertion into the white inner core; a spring arranged on a tail part of the ferrule assembly; a small white tube arranged in the spring for telescopic guide on the spring; a stop ring arranged on a tail part of the spring; a crimp ring sleeved on a tail part of the stop ring; a fixing device arranged on a tail part of the crimp ring; a rear frame sleeve sleeved on a tail part of the fixing device, the rear frame sleeve extending to be connected with the front frame sleeve, and the locking sleeve movably sleeved from a tail part of the rear frame sleeve; and a tail sleeve into which a tail part of the locking sleeve extends, the locking sleeve being capable of rotating around an outer wall of the tail sleeve.

In the disclosure, the ferrule assembly is provided with a first convex ring at an outer side of the ferrule assembly, against which a front end of the spring abuts. The stop ring is internally provided with a first retaining ring, against which a rear end of the spring abuts.

In the disclosure, the SC optical fiber connector is further provided with a first waterproof ring and a second waterproof ring. The front frame sleeve and the rear frame sleeve are respectively provided with a first external thread and a first internal thread for threaded connection. The front frame sleeve is provided with a first waterproof groove, into which the first waterproof ring is inserted, arranged at an inner side edge of the first external thread, the first waterproof ring is pressed in the first internal thread of the rear frame sleeve. A front end of the rear frame sleeve and the front frame sleeve together form a second waterproof groove into which the second waterproof ring is inserted.

In the disclosure, the front frame sleeve is opened with a first mounting hole within which a first convex point and a second convex point with different sizes are arranged. The stop ring is provided at an outer side with a second convex ring which is provided with a first clamping groove matched with the first convex point and a second clamping groove matched with the second convex point. The stop ring is clamped in the first mounting hole by clamping the first convex point in the first clamping groove and clamping the second convex point in the second clamping groove.

In the disclosure, the ferrule assembly, the spring, and the small white tube are fitted into a first cavity formed by snap-fit of the stop ring with the white inner core. The white inner core, the ferrule assembly, the spring, the small white tube, and the stop ring, the crimp ring and the fixing device are disposed within a second cavity formed by the front frame sleeve and the rear frame sleeve.

In the disclosure, the fixing device is a fixing cylinder sleeved on a tail part of the crimp ring, and the tail sleeve has a circular inner hole.

In the disclosure, the crimp ring is provided with an aluminum ring outside the tail part of the crimp ring.

In the disclosure, the fixing device includes two oppositely arranged fixing clamping plates each being provided at an inner side with a third clamping groove and a first positioning column, the first positioning column of one of the clamping plates is clamped into the third clamping groove of the other one of the clamping plates. Each of the clamping plates is provided at the inner side with a first semicircular groove, and a second semicircular groove with a smaller radius than that of the first semicircular groove at both sides of the first semicircular groove, the two first semicircular grooves form a first circular hole and two pairs of the second semicircular grooves form two second circular hole, when the two clamping plates are fixed. The tail sleeve has an inner ribbon hole.

In the disclosure, the second semicircular groove is provided with a first dispensing slot in which a first dispensing hole is provided, and the first semicircular groove is provided with a second dispensing hole.

In the disclosure, the fixing device has a first outer circumferential surface circumferentially tapered toward the tail part of the fixing device, the rear frame sleeve has a through hole circumferentially tapered toward the tail part of the rear frame sleeve, and the through hole decreases by a magnitude greater than that of the first outer circumferential surface for the same length.

In the disclosure, an adhesive heat-shrinkable sleeve is arranged on the tail part of the rear frame sleeve for securing an external cable.

In the disclosure, the front frame sleeve is sleeved by a dust cap which has a tail part with a second internal thread matched with the SC external thread that is screwed into the second internal thread, and an inner wall pressed against the second waterproof ring.

In the disclosure, the stop ring has a third external thread at the tail part of the stop ring, and the crimp ring has a third internal thread that matches with the third external thread, and the third external thread is threaded into the third internal thread. The SC optical fiber connector is further provided with a connection handle having fixing rings at both ends, one of the fixing rings is sleeved outside the dust cap and the other one of the fixing rings is sleeved outside the tail sleeve.

In the disclosure, the optical fiber adapter includes an outer housing which is open at both ends and has a hollow interior, the outer housing is internally mounted with a fixing seat, the clamping seat which is assembled and connected with the fixing seat, an insertion pin which is mounted in the fixing seat and the clamping seat, a guide seat II mounted outside the clamping seat, and an elastic member for eliminating assembly clearance, and a stop shaft sleeve mounted outside the guide seat II.

In the disclosure, the elastic member includes a precision spring corresponding to the shape of the guide seat II, and is arranged between the fixing seat and the stop shaft sleeve and sleeved outside the guide seat II. The stop shaft sleeve is provided with a hollow shaft sleeve body, a convex ring connected with the shaft sleeve body, a second elastic pressing arm arranged on a side surface of the shaft sleeve body, and a second elastic pressing buckle arranged on the second elastic pressing arm and facing the outer housing.

In the disclosure, the outer housing is internally provided with a blind hole I and a blind hole II respectively at two open ends, a through hole I between the blind hole I and the blind hole II, and a mounting position I formed between the blind hole II and the through hole I for mounting the fixing seat. The blind hole I is provided with an internal thread I. The blind hole II is provided with a lead-in groove which is communicated with the mounting position I and facilitates mounting of the fixing seat, an inner boss I for limiting the elastic member 40, an outer boss I for mounting the stop shaft sleeve, a limiting position and a buckle hole for mounting the stop shaft sleeve. The mounting position I is provided with a limiting groove I for limiting the mounting position of the fixing seat, and a fool-proof position for limiting the mounting direction of the fixing seat.

In the disclosure, the outer housing is provided at an outer side with an external thread I and a flange structure. A fixing member is arranged outside the outer housing, which includes a fixing nut corresponding to the external thread I. An O-ring is arranged at one side of the flange structure facing the fixing member.

In the disclosure, a locking frame II is further arranged outside the outer housing and at the open end of the blind hole I. The shaft sleeve body is internally provided with a clearance III, and a reinforcing rib is arranged at one side of the second elastic pressing arm facing the clearance III.

In the disclosure, the fixing seat is provided with a body I, a guide seat I connected to one side of the body I, a mounting position II arranged on the other side of the body I for mounting the clamping seat, a mounting position III for mounting the guide seat II, a through hole III in the center of the body I, and a fool-proof position; the guide seat I is provided with a pin seat I with a pin hole I, and a chamfer I at an inner side of the guide seat I; the pin hole I is communicated with the through hole I and has a diameter smaller than that of the through hole I. A fixing block I and a positioning groove I are arranged within the mounting position II for positioning the clamping seat, and a fixing column I, a positioning hole I and a strip-shaped groove are arranged within the mounting position III for positioning the guide seat II. The clamping seat is provided with a body III, a pin seat II arranged in the center of the body III and having a pin hole II, a fixing block II, a positioning groove II, and an elastic pressing arm I arranged outside the pin seat II and having an elastic pressing buckle I facing the pin seat II. The guide seat II is provided with a body IV, a guide frame connected with the body IV, a mounting hole arranged in the body IV and used for mounting the clamping seat and the guide seat II, and a guide hole arranged in the guide frame and communicated with the mounting hole; the guide hole has an opening with a chamfer II, the body IV and the guide frame form a bearing platform used for bearing the elastic member, the body IV is provided at a lower side with a positioning hole II, a fixing column II and a strip-shaped convex block, the guide frame is provided with an external clearance I, an internal clearance II, and a guide groove in a side wall of the guide frame. The optical fiber adapter further includes a dust cover I which is arranged outside the stop shaft sleeve and is capable of being sleeved with the guide seat II, a dust cover II sleeved with the outer housing, and a connection handle II for connecting the dust cover II with the outer housing and having fixing rings II at both ends; the dust cover II is provided with a dust cap II at an end, an external thread II capable of being in threaded connection with the outer housing, a locking frame I arranged between the external thread II and the dust cap II, and a waterproof groove I arranged at a front end of the external thread II; a waterproof ring I is arranged in the waterproof groove I, and one of the fixing rings II of the connection handle II is sleeved in the locking frame I; the elastic member has a circular or elliptical cross-section.

The disclosure has the beneficial effects as follows. In the connection assembly of the disclosure, the optical fiber connector and the optical fiber adapter are respectively provided with an elastic member, so that the optical fiber connector and the optical fiber adapter are tightened under a pre-tightening force after connected. Furthermore, by arranging multiple sealing structures at the connection positions of the connection assembly, the sealing performance of the connecting components is enhanced. By improving the internal structure of the optical fiber connector, the stop ring cannot rotate after being assembled, which has a good circumferential positioning effect, can prevent internal core wires from twisting, has a high quality in optical fiber docking, is not prone to displace the optical fibers after docking, and is high in reliability. In addition, by improving the internal structure of the optical fiber adapter, the optical fiber adapter is simple and convenient to assemble, the influence of the assembling gap on the assembling precision is eliminated, so that the requirement on the assembling precision is guaranteed. Also, the precision of opposite insertion between the optical fiber connectors and the optical fiber adapter can be guaranteed, thereby reducing the loss of signal conversion.

BRIEF DESCRIPTION OF THE DRAWINGS

The disclosure is further illustrated by the embodiments in combination with the accompanying drawings, in which.

DETAILED DESCRIPTION OF THE EMBODIMENTS

To make objectives, technical solutions and advantages of embodiments of the disclosure more clear, technical solutions according to embodiments of the disclosure will be described clearly and thoroughly with reference to the accompanying drawings.

Embodiments

Figure 1:
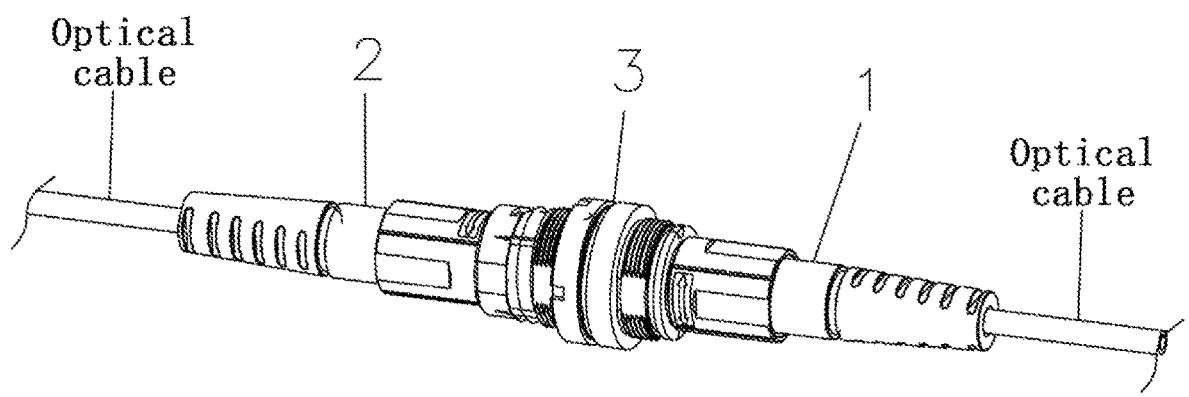
FIG. 1 is a schematic view showing the structure of a connection assembly according to the disclosure.
Figure 2:
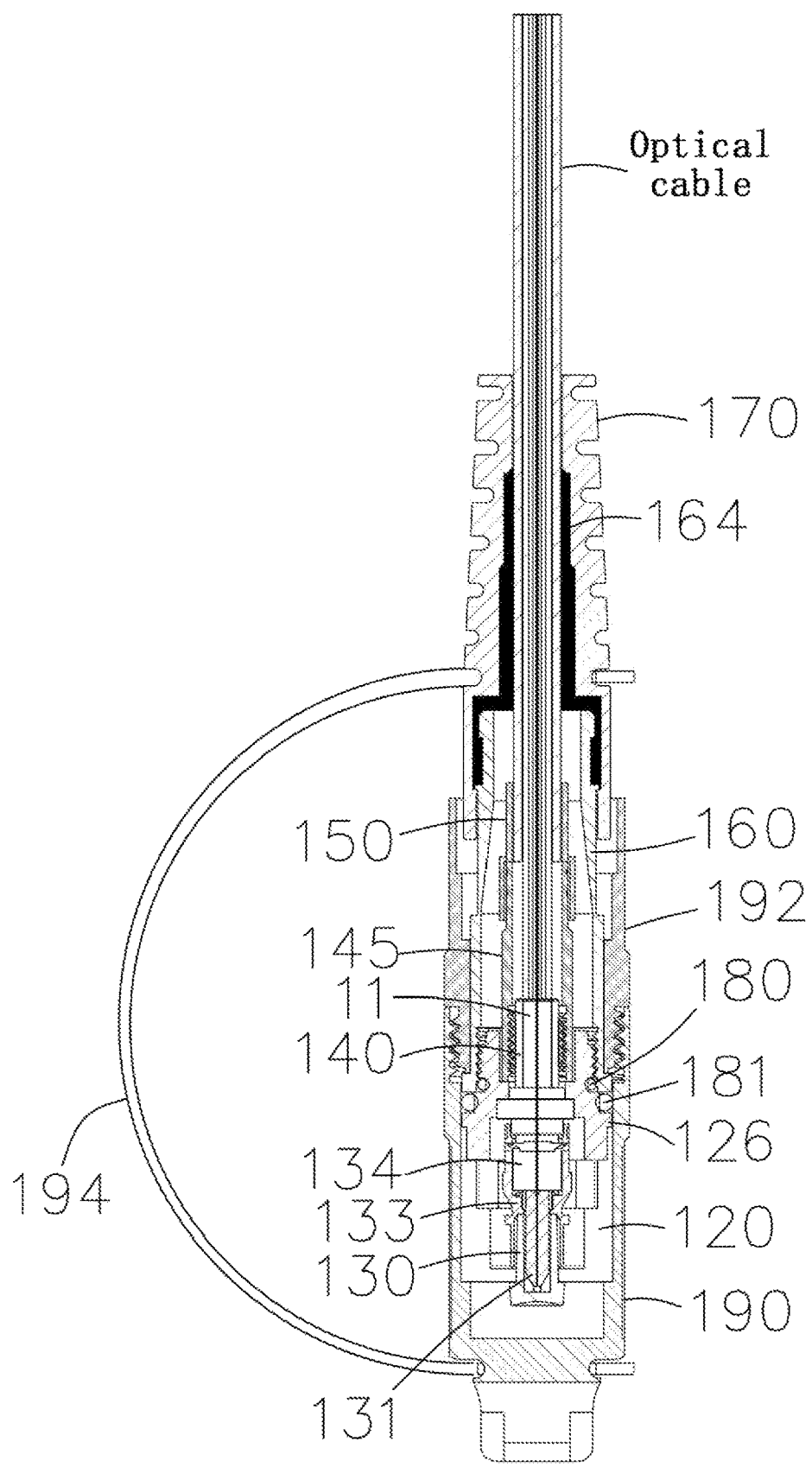
FIG. 2 is a schematic view showing the structure of a SC optical fiber connector for a circular optical cable according to the disclosure.
Figure 3:
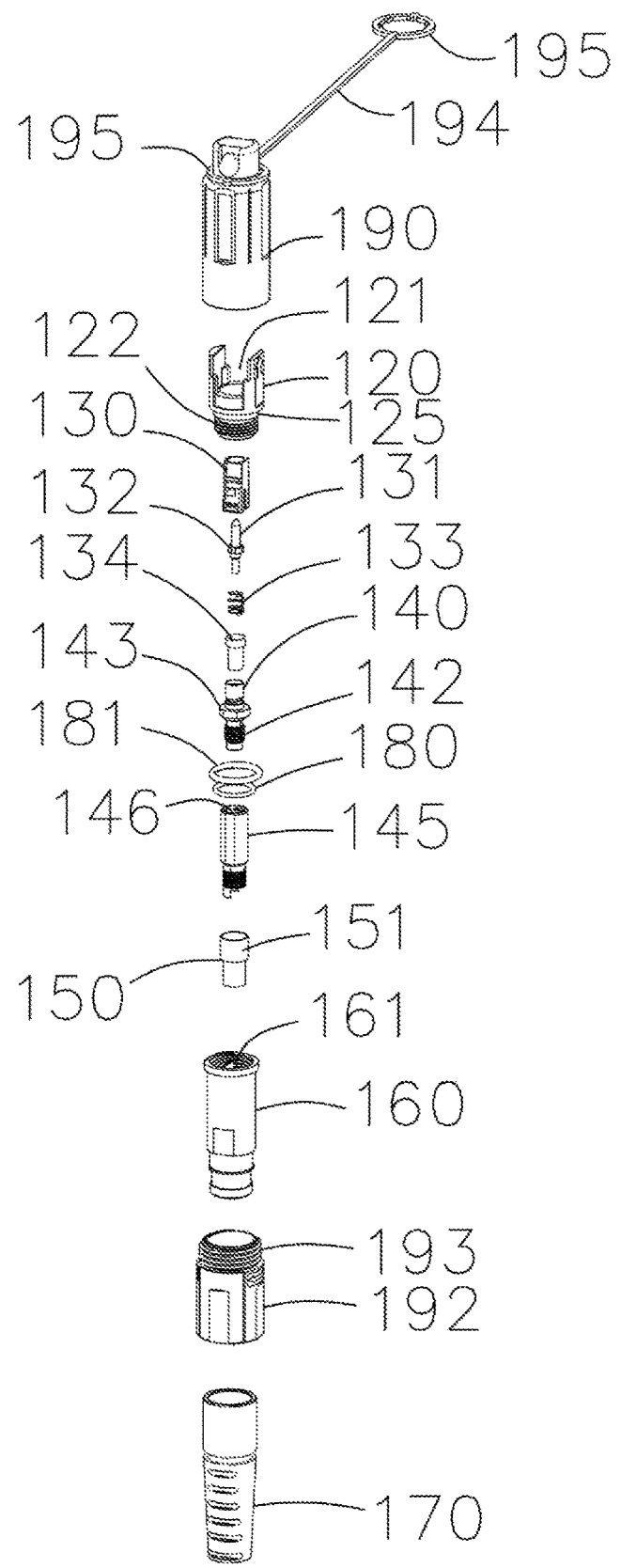
FIG. 3 is a schematic exploded view showing the structure of the SC optical fiber connector for a circular optical cable according to the disclosure.
Figure 4:
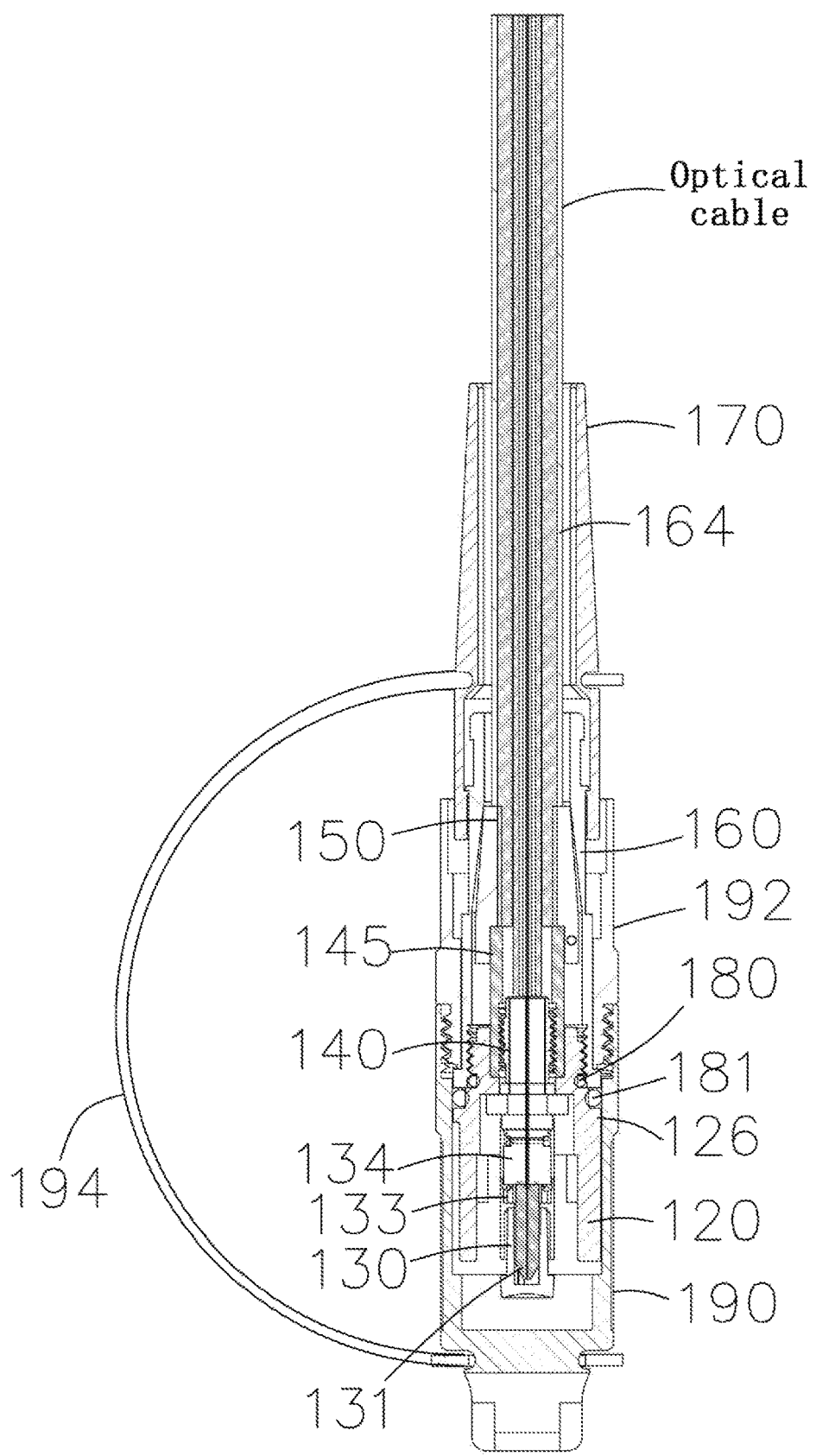
FIG. 4 is a schematic view showing the structure of a SC optical fiber connector for a ribbon optical cable according to the disclosure.
Figure 5:
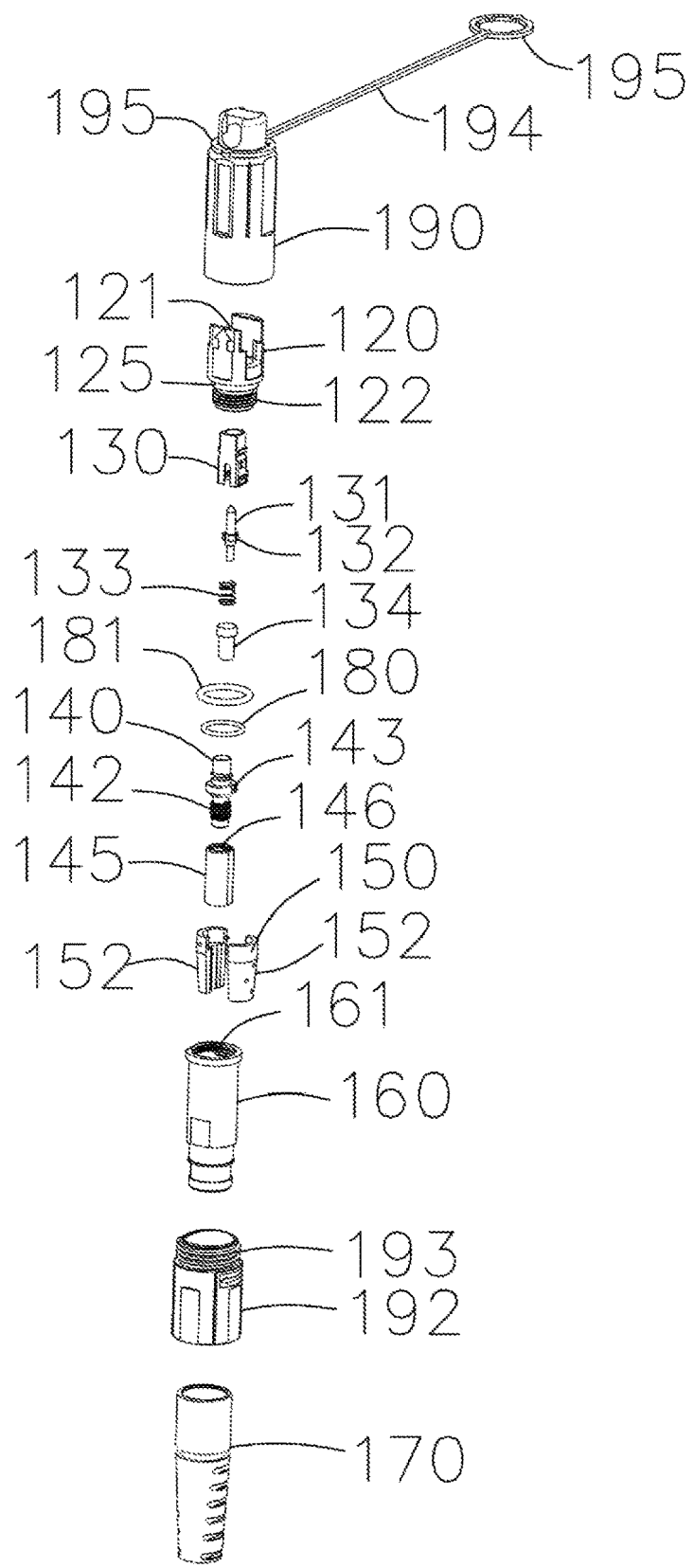
FIG. 5 is a schematic exploded view showing the structure of the SC optical fiber connector for a ribbon optical cable according to the disclosure.
Figure 6:
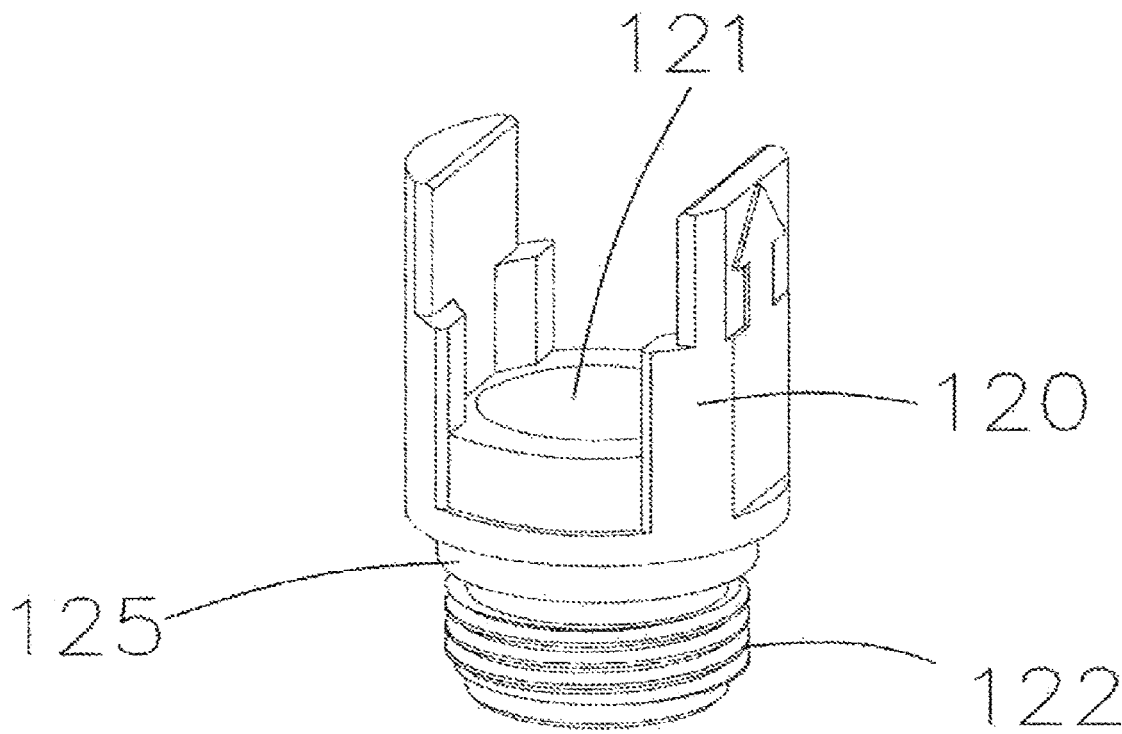
FIG. 6 is a schematic view showing the structure of a front frame sleeve of the SC optical fiber connector according to the disclosure.
Figure 7:
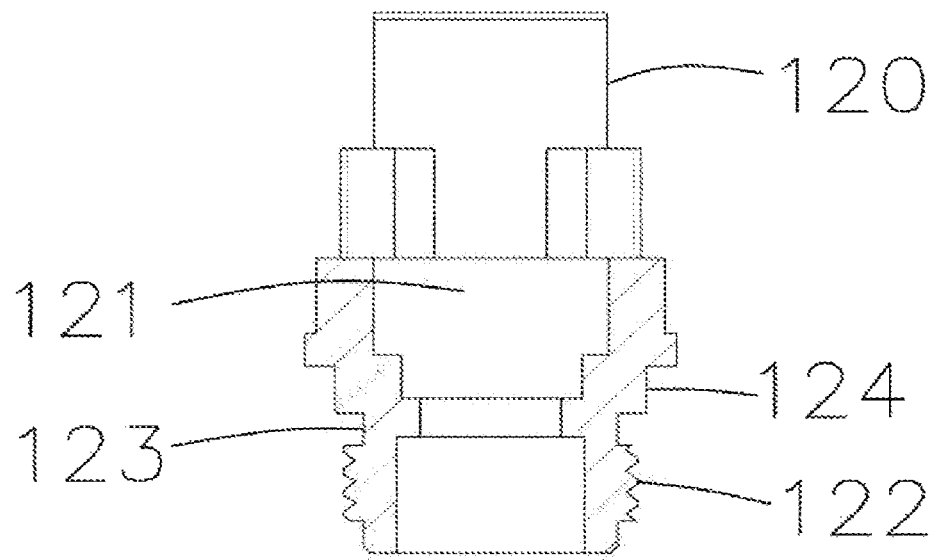
FIG. 7 is a schematic cross-sectional view showing the structure of the front frame sleeve of the SC optical fiber connector according to the disclosure.
Figure 8:
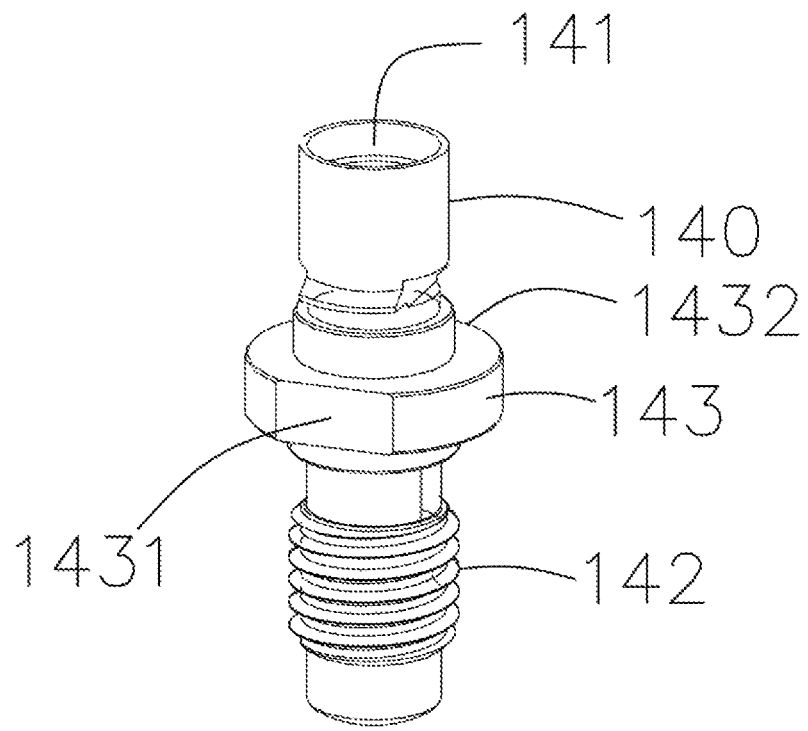
FIG. 8 is a schematic view showing the structure of a stop ring of the SC optical fiber connector according to the disclosure.
Figure 9:
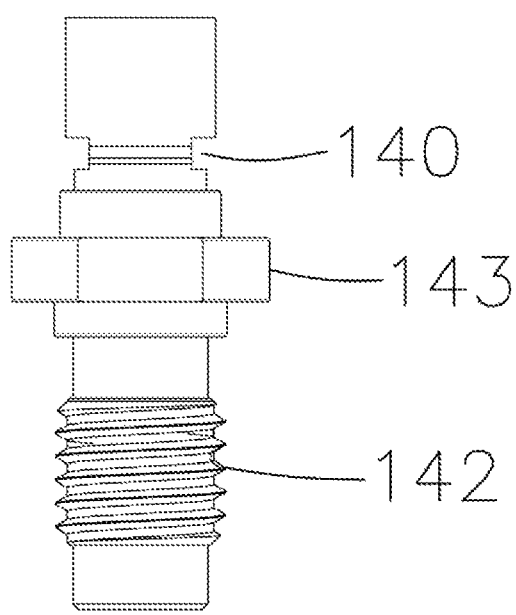
FIG. 9 is a schematic cross-sectional view showing the structure of the stop ring of the SC optical fiber connector according to the disclosure.
Figure 10:
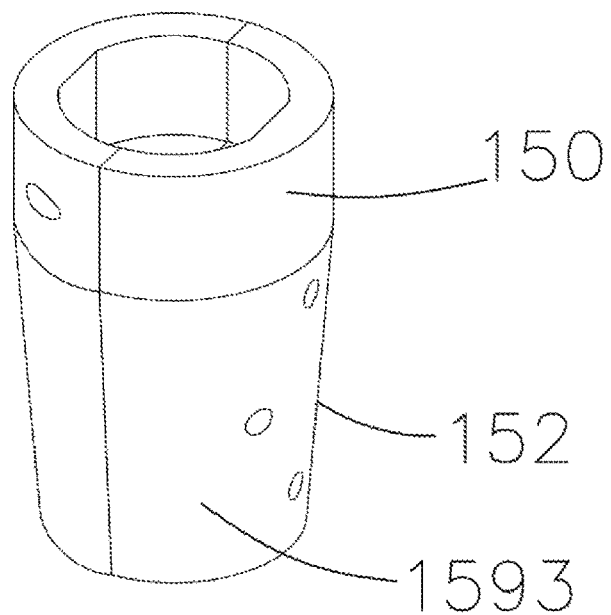
FIG. 10 is a schematic view showing the structure of two clamping plates, after assembled, of the SC optical fiber connector according to the disclosure.
Figure 11:
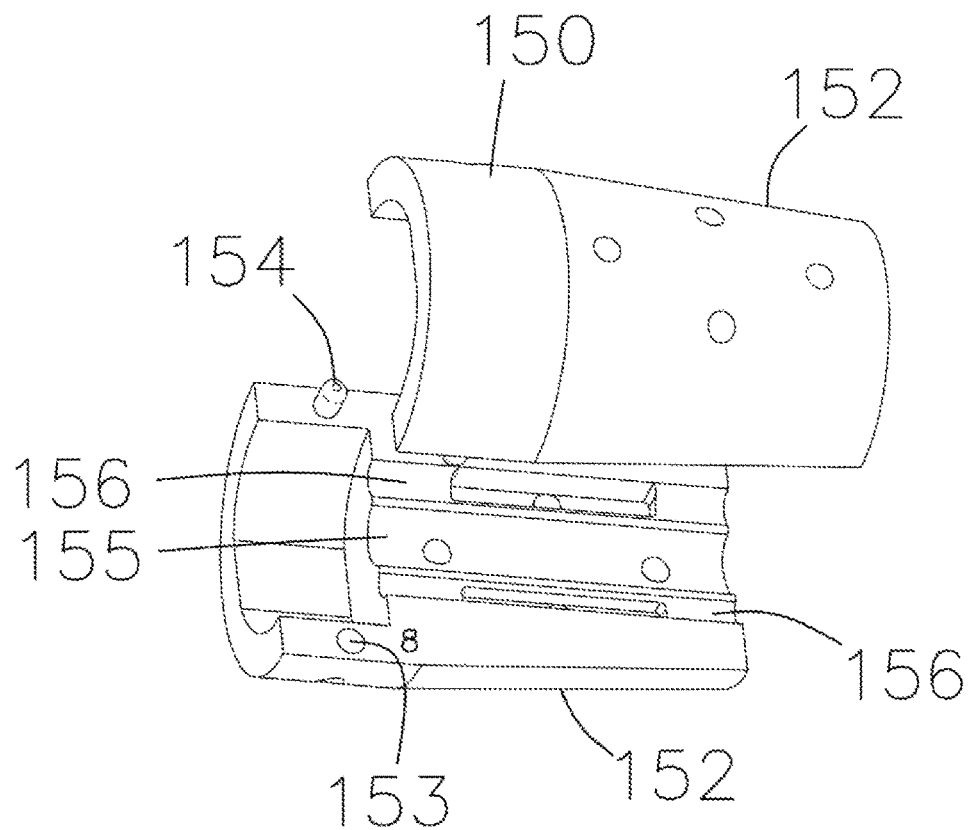
FIG. 11 is a schematic view showing the structure of two clamping plates, when separated, of the SC optical fiber connector according to the disclosure.
Figure 12:
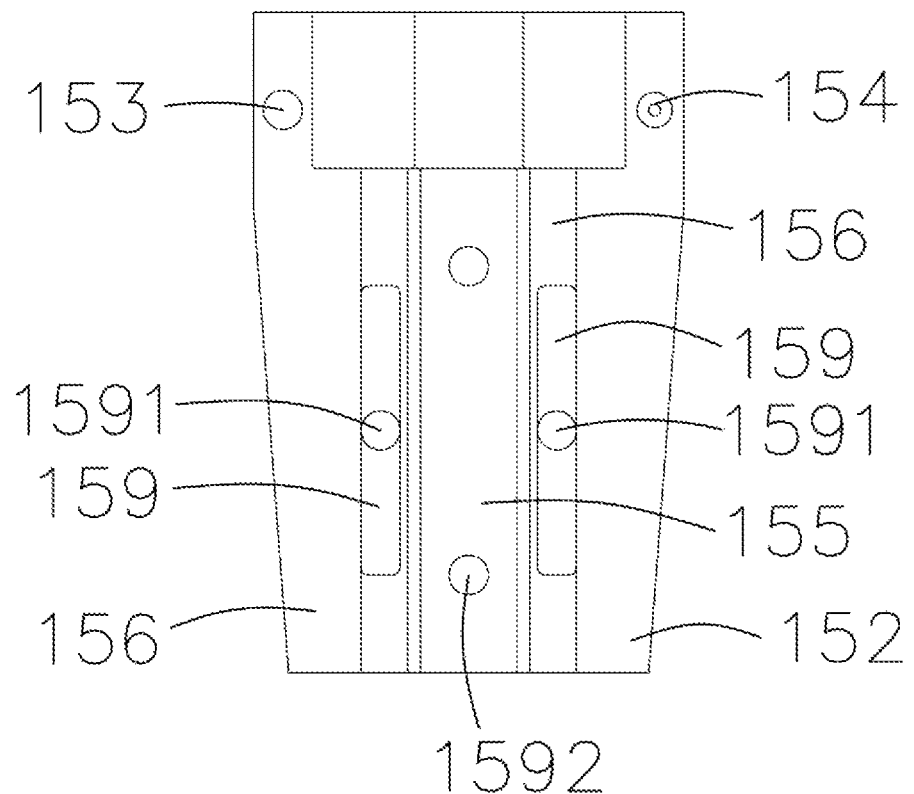
FIG. 12 is a schematic view showing the structure of a clamping plate of the SC optical fiber connector according to the disclosure.
Figure 13:
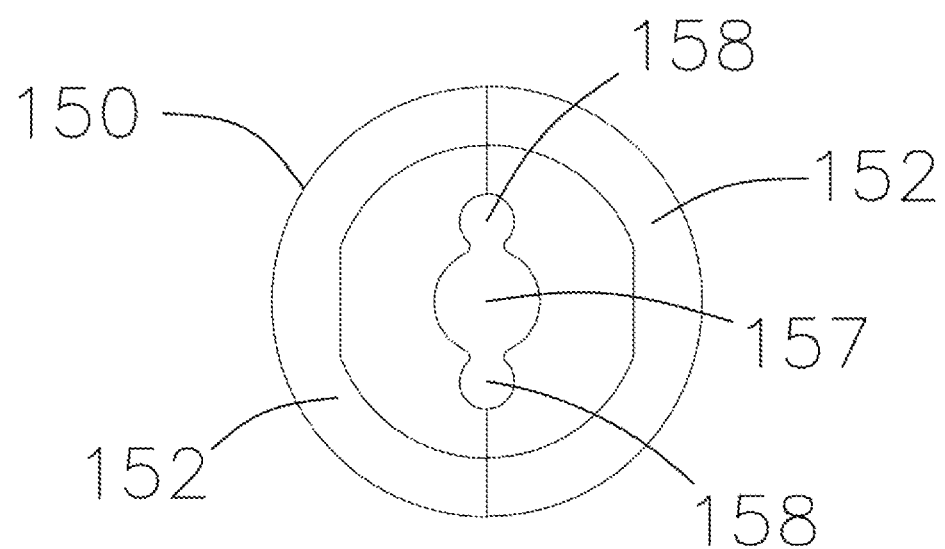
FIG. 13 is a schematic cross-sectional view showing the structure of two clamping plates, after assembled, of the SC optical fiber connector according to the disclosure.
Figure 14:
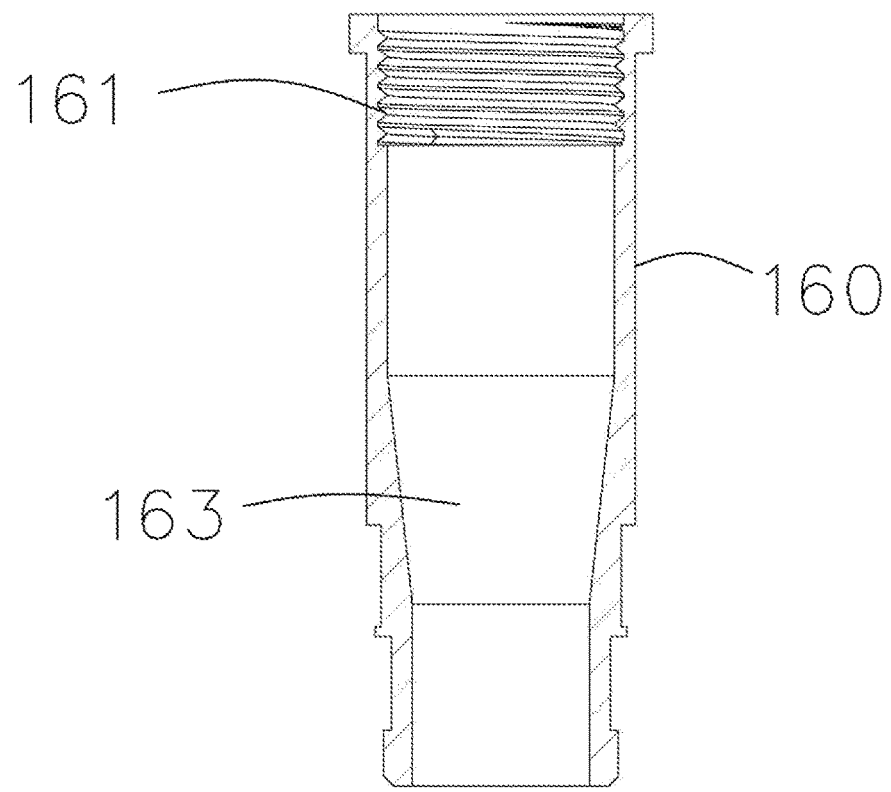
FIG. 14 is a schematic cross-sectional view showing the structure of a rear frame sleeve of the SC optical fiber connector according to the disclosure.
Figure 15:
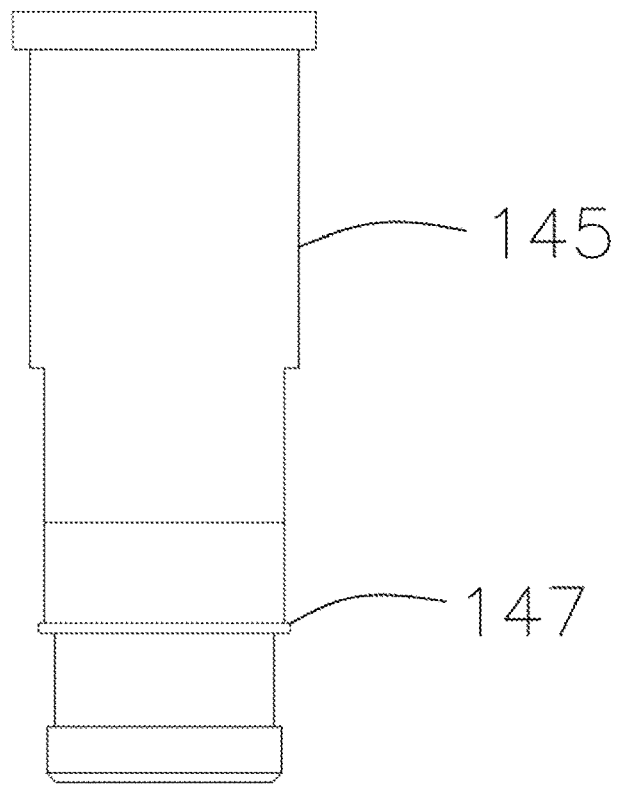
FIG. 15 is a schematic view showing the structure of a crimp ring of the SC optical fiber connector according to the disclosure.
Figure 16:
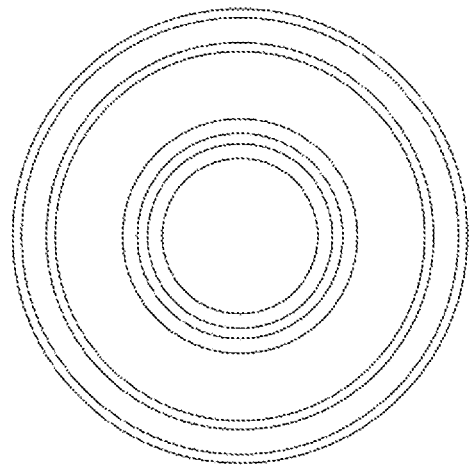
FIG. 16 is a schematic cross-sectional view showing the structure of a circular tail sleeve of the SC optical fiber connector according to the disclosure.
Figure 17:
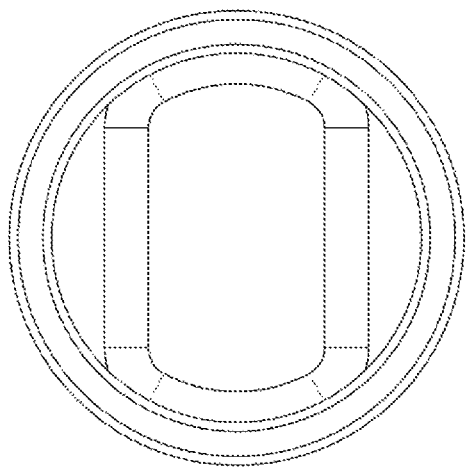
FIG. 17 is a schematic cross-sectional view showing the structure of a ribbon tail sleeve of the SC optical fiber connector according to the disclosure.
Figure 18:
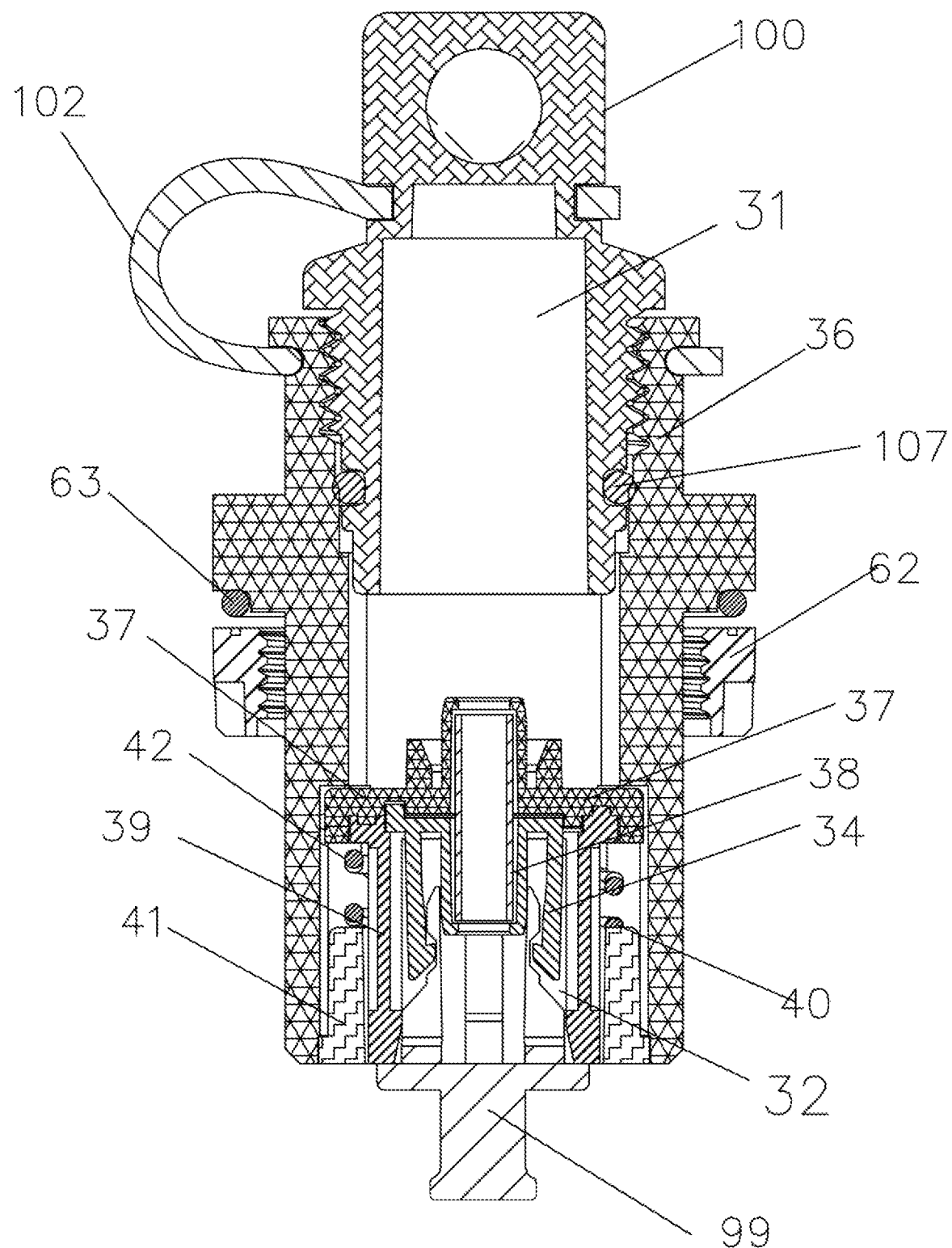
FIG. 18 is a schematic view showing the structure of an optical fiber adapter according to the disclosure.
Figure 19:
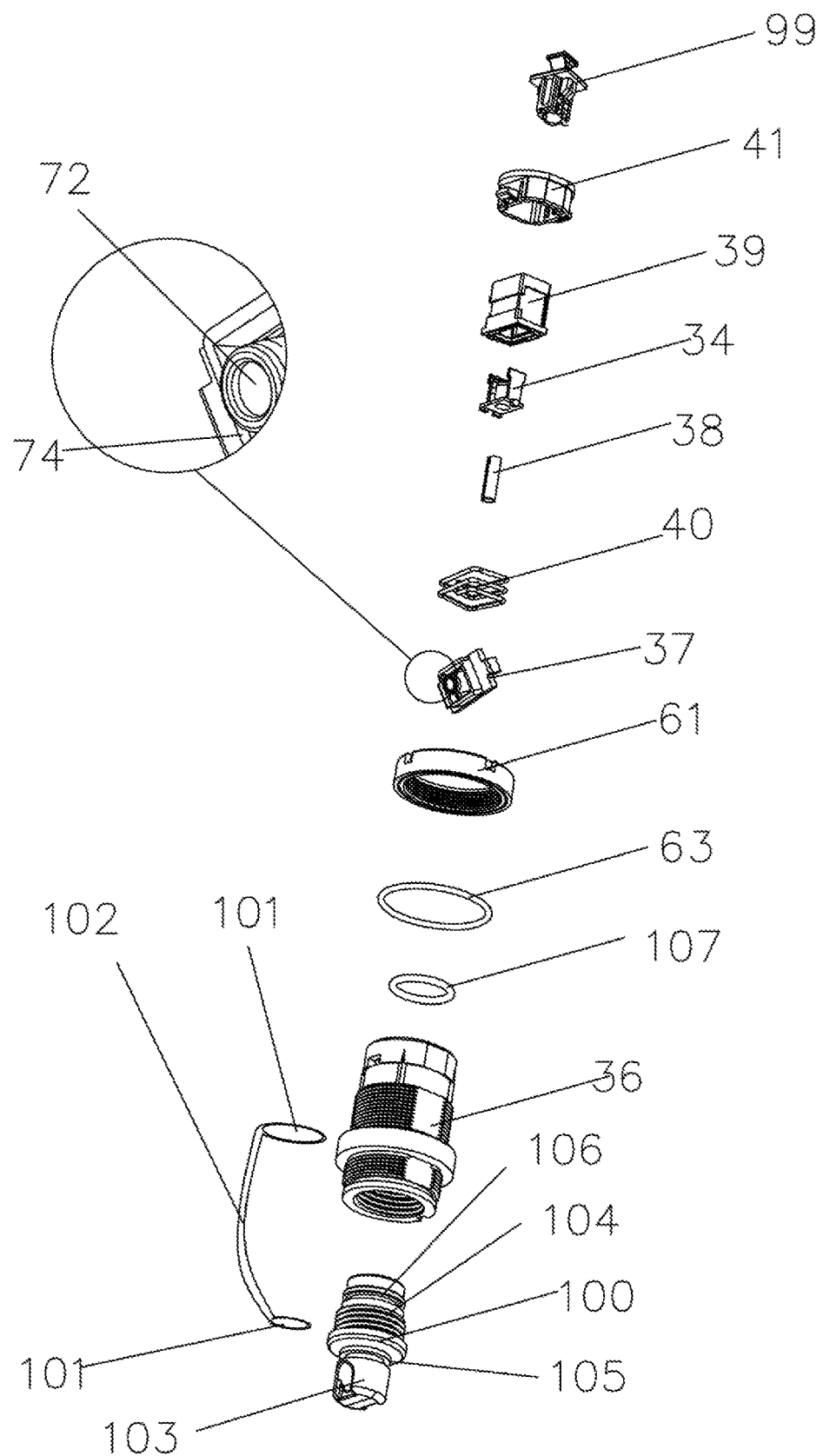
FIG. 19 is a schematic exploded view showing the structure of the optical fiber adapter according to the disclosure.
Figure 20:
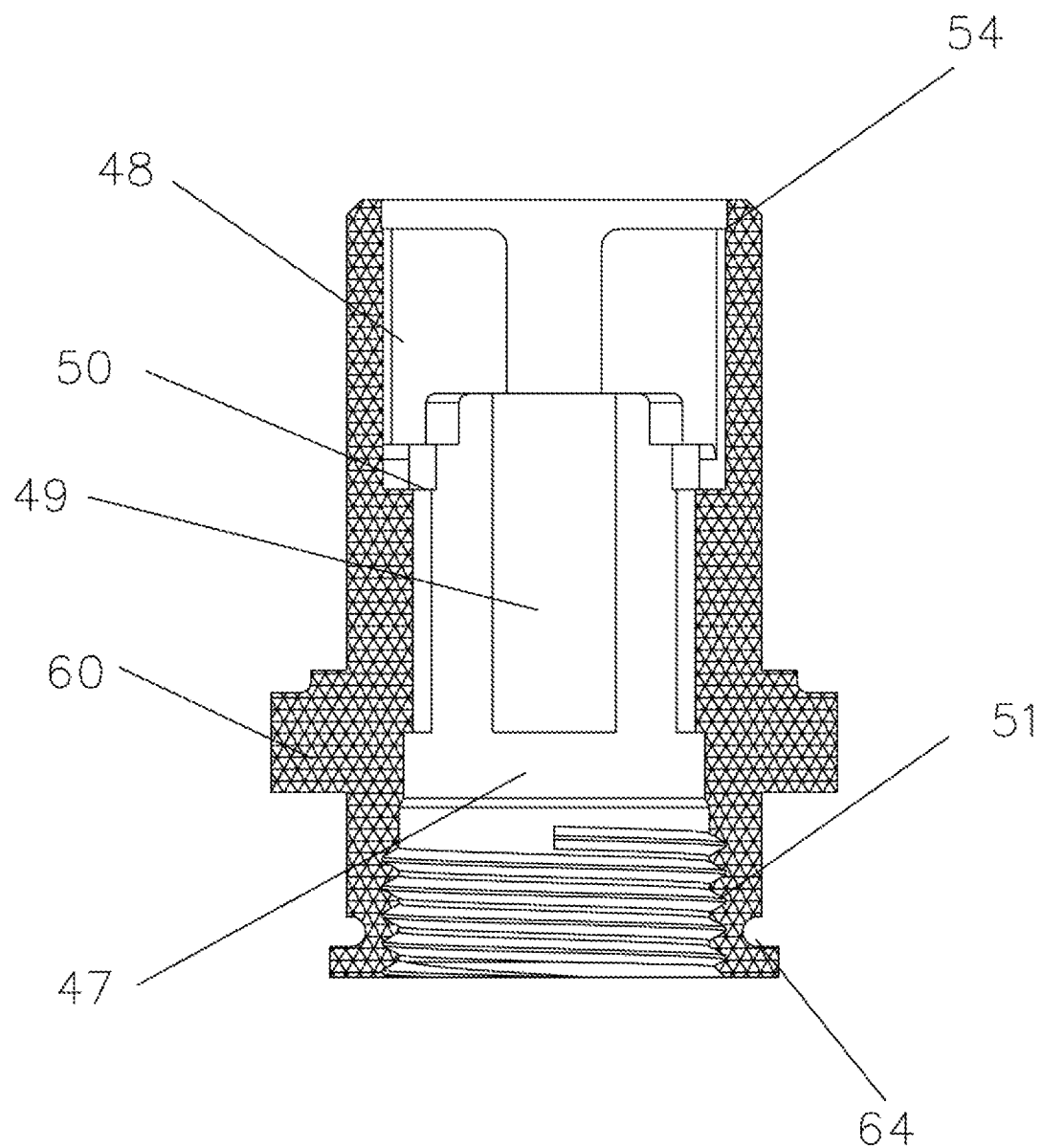
FIG. 20 is a schematic cross-sectional view showing the structure of an outer housing of the optical fiber adapter according to the disclosure.
Figure 21:
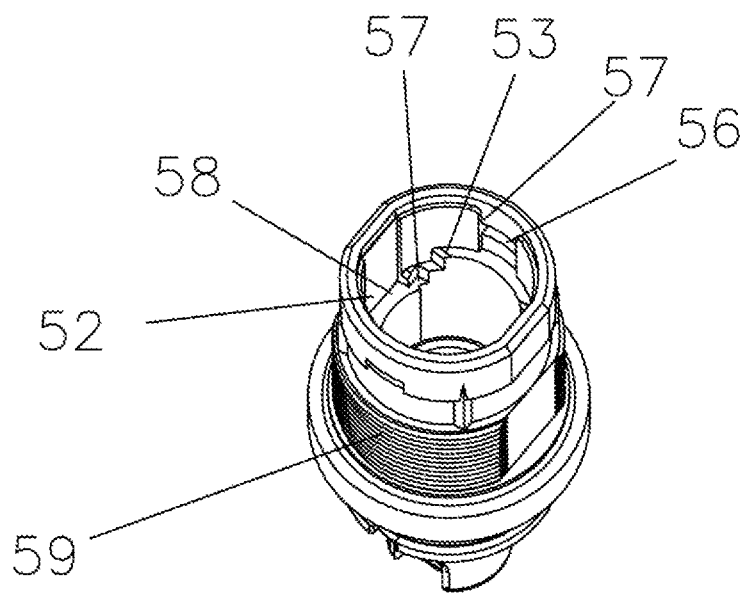
FIG. 21 is a schematic view showing the structure of an outer housing of the optical fiber adapter according to the disclosure.
Figure 22:
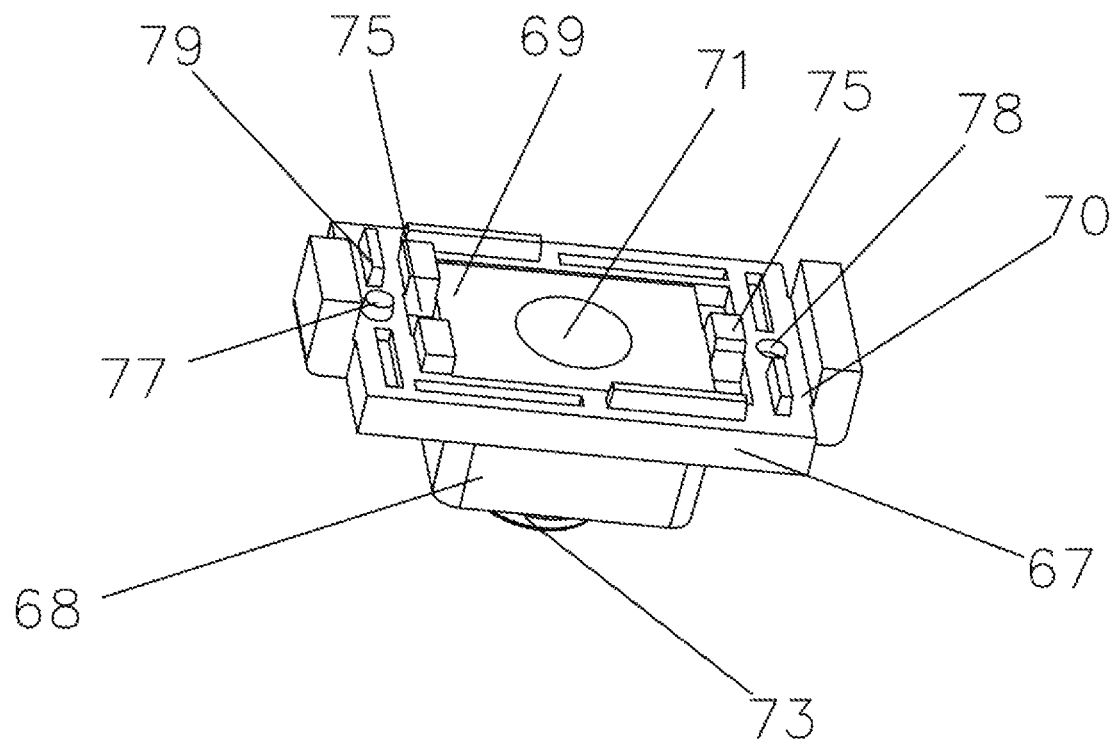
FIG. 22 is a schematic view showing the structure of a fixing seat of the optical fiber adapter according to the disclosure.
Figure 23:
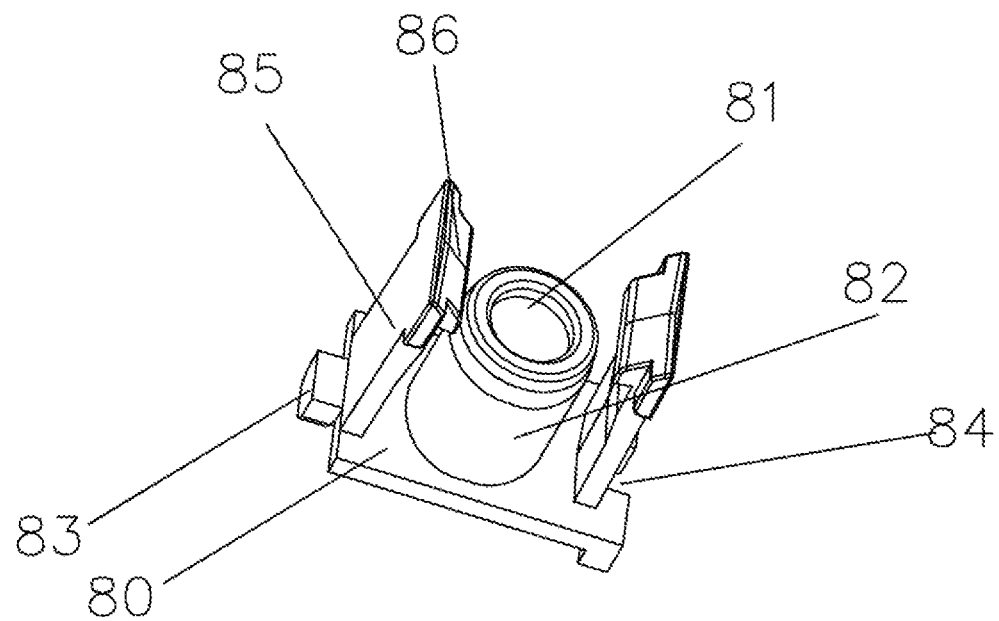
FIG. 23 is a schematic view showing the structure of a clamping seat of the optical fiber adapter according to the disclosure.
Figure 24:
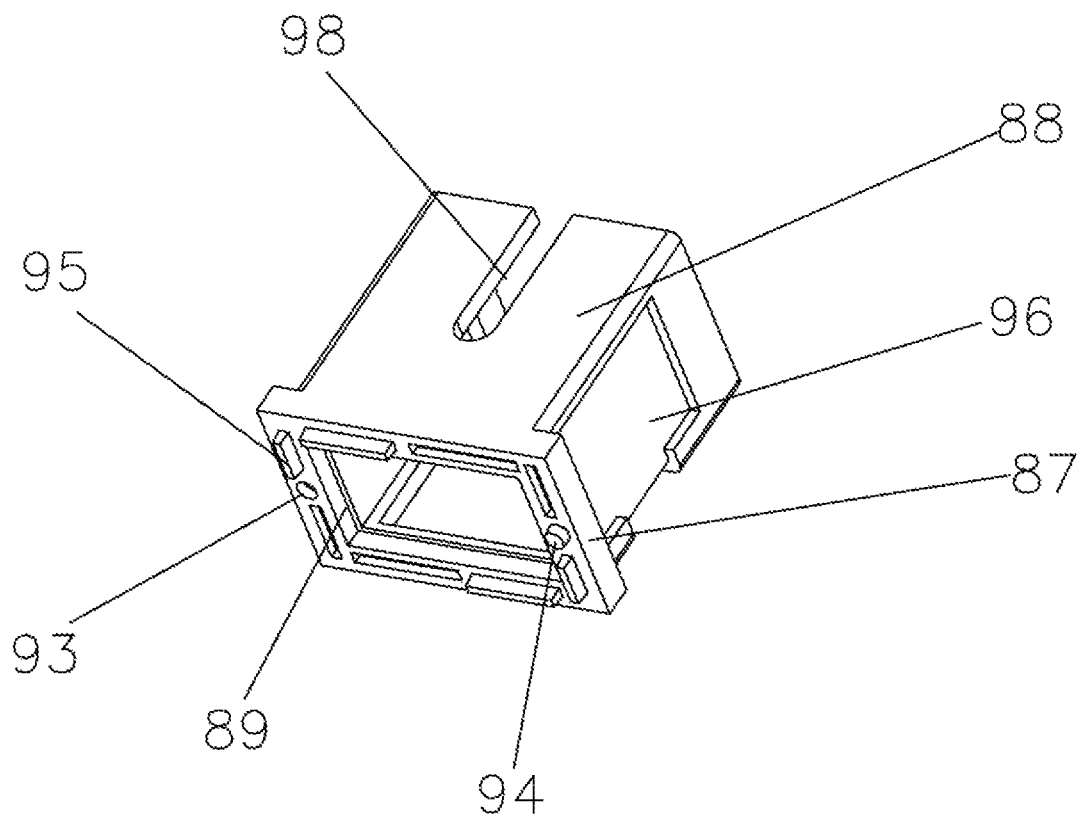
FIG. 24 is a schematic view showing the structure of a guide seat II of the optical fiber adapter according to the disclosure.
Figure 25:
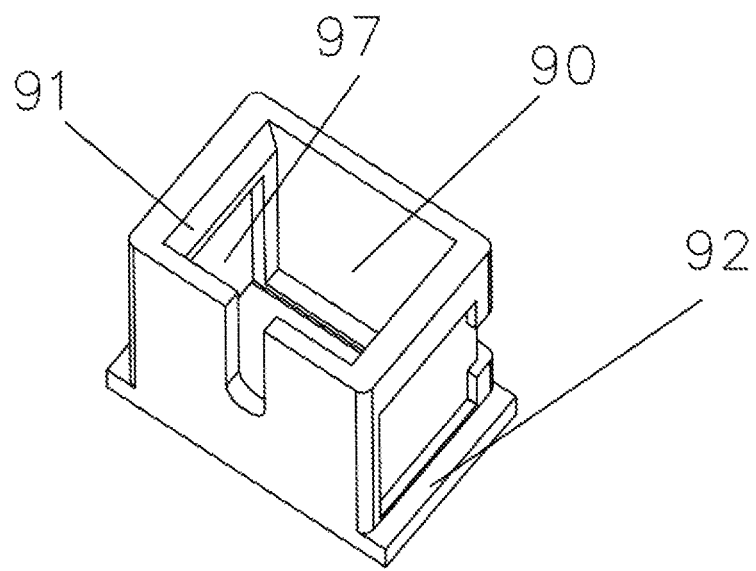
FIG. 25 is a schematic view showing the structure of the guide seat II, in another direction, of the optical fiber adapter according to the disclosure.
Figure 26:
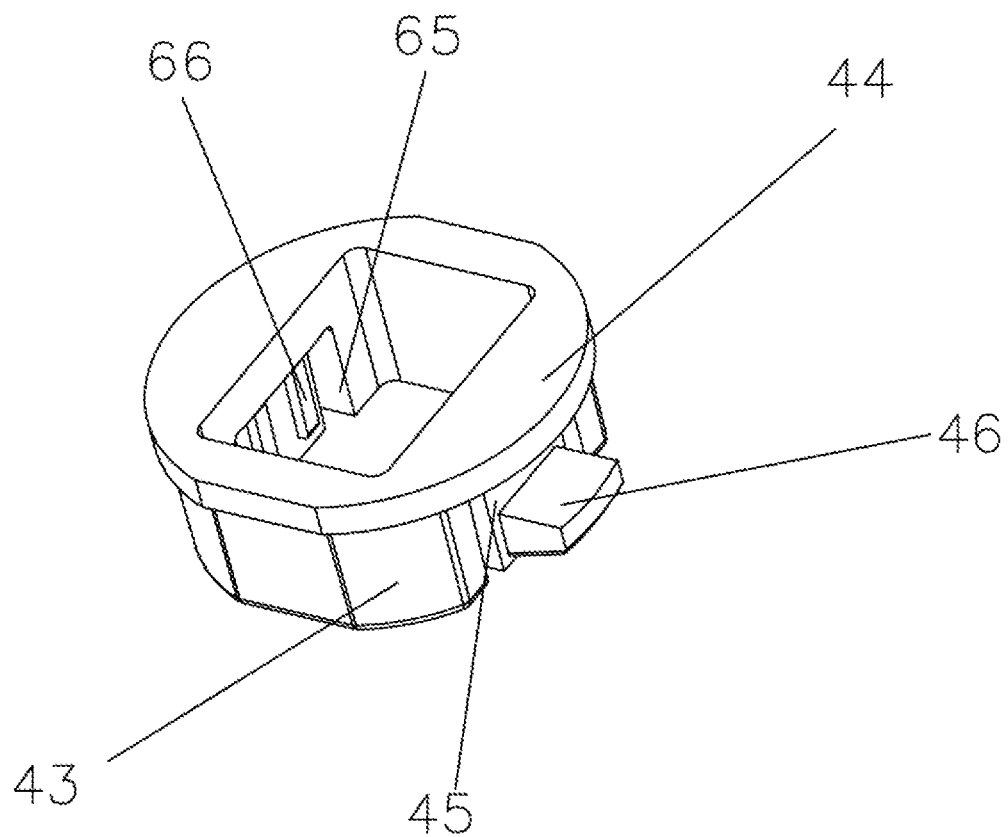
FIG. 26 is a schematic view showing the structure of a stop shaft sleeve of the optical fiber adapter according to the disclosure.

As shown in FIGS. 1 to 26, in an embodiment, an outdoor optical fiber connection assembly is disclosed, including an SC optical fiber connector 1, an LC optical fiber connector 2, and an optical fiber adapter 3 for communicatively connecting the SC optical fiber connector 1 with the LC optical fiber connector 2. The optical fiber adapter 3 is provided at opposite ends respectively with an SC connecting end 31 and an LC connecting end 32 which are correspondingly connected with the SC optical fiber connector 1 and the LC optical fiber connector 2. The SC optical fiber connector 1 is provided with an internal insertion channel 11 for inserting and mounting an optical cable, a ferrule assembly 131 for communication with the optical cable at one end of the SC optical fiber connector 1, a white inner core 130 arranged on a periphery of the ferrule assembly 131 for inserting into and circumferentially positioning the SC connecting end 31, and a locking sleeve 192 on a periphery of the SC optical fiber connector 1 which is configured for removable connection with the optical fiber adapter 3 and has one end with an SC external thread 193. The SC connecting end 31 of the optical fiber adapter 3 is provided with a first through hole which is configured for insertion of the ferrule assembly 131 and communication of the SC connecting end 31 with the LC connecting end 32, a clamping seat 34 for snap-fit connection with and circumferential positioning the white inner core 130, and an SC internal thread matched with the SC external thread 193, wherein a square positioning structure is adopted for the white inner core 130 and the clamping seat 34. The SC optical fiber connector 1 and the LC optical fiber connector 2 are connected by respectively inserting into the SC connecting end 31 and the LC connecting end 32 of the optical fiber adapter 3, so as to achieve a communicative connection within the first through hole. Because the first through hole has a certain length, the optical fibers can realize communication in the first through hole, and the connection stability is extremely high. Furthermore, this connection has a high tightness due to the fact that the optical fiber connectors are inserted into the optical fiber adapter, so that dust, rainwater and the like in an outdoor environment can be effectively prevented from entering, and external signal interference can also be prevented.

As a preferred embodiment, a periphery of the SC connecting end 31 is provided with a front frame sleeve 120 within which the white inner core 130 is mounted. The ferrule assembly 131 has a head for insertion into the white inner core 130. A spring 133 is arranged on a tail part of the ferrule assembly 131, a small white tube 134 for telescopic guide on the spring 133 is arranged in the spring 133, a stop ring 140 is arranged on a tail part of the spring 133, a crimp ring 145 is sleeved on a tail part of the stop ring 140, a fixing device 150 is arranged on a tail part of the crimp ring 145, a rear frame sleeve 160 is sleeved on a tail part of the fixing device 150, and the rear frame sleeve 160 extends to be connected with the front frame sleeve 120. The locking sleeve 192 is movably sleeved from a tail part of the rear frame sleeve 160, a tail part of the locking sleeve 192 extends into a tail sleeve 170, and the locking sleeve 192 may rotate around an outer wall of the tail sleeve 170. The stop ring 140 and the crimp ring 145, the front frame sleeve 120 and the rear frame sleeve 160 may both be in threaded connection, which is convenient and can achieve good dustproof and waterproof effects.

As a preferred embodiment, the ferrule assembly 131 is provided with a first convex ring 132 at an outer side of the ferrule assembly 131, against which a front end of the spring 133 abuts. The stop ring 140 is internally provided with a first retaining ring 141, against which a rear end of the spring 133 abuts.

As a preferred embodiment, the SC optical fiber connector 1 is further provided with a first waterproof ring 180 and a second waterproof ring 181. The front frame sleeve 120 and the rear frame sleeve 160 are respectively provided with a first external thread 122 and a first internal thread 161 for threaded connection. The front frame sleeve 120 is provided with a first waterproof groove 125, into which the first waterproof ring 180 is inserted, arranged at an inner side edge of the first external thread 122, the first waterproof ring 180 is pressed in the first internal thread 161 of the rear frame sleeve 160. A front end of the rear frame sleeve 160 and the front frame sleeve 120 together form a second waterproof groove 126 into which the second waterproof ring 181 is inserted. The first waterproof ring 180 is tightly clamped in the first waterproof groove 125 of the front frame sleeve 120, the rear frame sleeve 160 is locked on the first external thread 122 at a rear end of the front frame sleeve 120 by a threaded hole at the front end of the rear frame sleeve 160, and the first waterproof ring 180 is pressed in the first internal thread 161 of the rear frame sleeve 160, so that other impurities such as water or dust can be prevented from permeating from a gap where the rear frame sleeve 160 and the front frame sleeve 120 are connected. The second waterproof ring 181 is tightly clamped in the second waterproof groove 126 formed after the front frame sleeve 120 and the rear frame sleeve 160 are tightened, so that other impurities such as water or dust can be prevented from permeating from above.

As a preferred embodiment, the stop ring 140 is provided with a second convex ring 143 at an outer side of the stop ring 140, the front frame sleeve 120 is opened with a first mounting hole 121 within which a first convex point 123 and a second convex point 124 with different sizes are arranged. The second convex ring 143 is provided with a first clamping groove 1431 matched with the first convex point 123 and a second clamping groove 1432 matched with the second convex point 124. The stop ring 140 is clamped in the first mounting hole 121 by clamping the first convex point 123 in the first clamping groove 1431 and clamping the second convex point 124 in the second clamping groove 1432. Therefore, during fixation of the stop ring 140 in the front frame sleeve 120, only when the first convex point 123 is clamped in the first clamping groove 1431 and the second convex point 124 is clamped in the second clamping groove 1432, can the mounting be successful, ensuring a correct mounting of the stop ring 140. Furthermore, the stop ring 140 cannot rotate after being mounted, which enables a good circumferential positioning effect, can prevent the internal core wire from twisting, and increases the anti-twisting capability of the stop ring 140 in the front frame sleeve 120. The optical fibers can be docked with high quality, and are not prone to be displaced after docked, which has high reliability.

As a preferred embodiment, the ferrule assembly 131, the spring 133, and the small white tube 134 are fitted into a first cavity formed by the snap fit of the stop ring 140 with the white inner core 130, and the white inner core 130, the ferrule assembly 131, the spring 133, the small white tube 134, and the stop ring 140, the crimp ring 145 and the fixing device 150 are disposed within a second cavity formed by the front frame sleeve 120 and the rear frame sleeve 160. The first convex ring 132 and the first retaining ring 141 limit respectively two ends of the spring 133, the ferrule assembly 131 is movable to certain extent in the first cavity. The internal structure of the outdoor optical fiber connector is firmer and more reliable by the elastic force of the spring 133.

As a preferred embodiment, the fixing device 150 is a fixing cylinder 151 sleeved on a tail part of the crimp ring 145, and the tail sleeve 170 has a circular inner hole, in which case the outdoor optical fiber connector of the disclosure may be used for connecting a circular outdoor optical cable. The fixing device 150 may be arranged according to the type of the external optical cable, and may be used for fixing a circular optical cable when the structure is matched with the circular optical cable, or may be used for fixing a ribbon cable when the structure is matched with the ribbon cable.

As a preferred embodiment, the crimp ring 145 is provided with an aluminum ring 147 outside the tail part of the crimp ring 145. The fixing cylinder 151 tightly presses the Kevlar wire inside the circular optical cable onto the aluminum ring 147 at a rear end of the crimping ring 145 as a main pulling structure of the overall connector and the circular optical cable, and a rear end of the fixing cylinder 151 presses an outer skin of the circular optical cable to fix the circular optical cable. The fixing cylinder 151 presses the Kevlar wire inside the optical cable onto the aluminum ring 147, which is firm and reliable as the aluminum ring 147, which is made of an aluminum material, will not be broken after pressing deformation.

As a preferred embodiment, the fixing device 150 includes two oppositely arranged fixing clamping plates 152 each being provided at an inner side with a third clamping groove 153 and a first positioning column 154, wherein the first positioning column 154 of one of the clamping plates is clamped into the third clamping groove 153 of the other one of the clamping plates. Each of the clamping plates is provided at the inner side with a first semicircular groove 155, and a second semicircular groove 156 with a smaller radius than that of the first semicircular groove 155 at both sides of the first semicircular groove 155. When the two clamping plates are fixed, the two first semicircular grooves 155 form a first circular hole 157, and two pairs of the second semicircular grooves 156 form two second circular holes 158. The tail sleeve 170 has an inner ribbon hole. The fixing device 150 is formed by combining the same two clamping plates, and when the two clamping plates are closed, the first positioning column 154 of one of the clamping plates is clamped into the third clamping groove 153 of the other one of the clamping plates. This structure can be used for connecting a ribbon cable, and by matching the first positioning column 154 with the third clamping groove 153, which is simple in structure, it is convenient to fix two clamping plates. When connecting with a ribbon cable, the two second circular holes 158 respectively clamp two reinforcing members of the ribbon cable, and the first circular hole 157 can clamp a reinforcing member at a center of the ribbon cable and the Kevlar wire. The structure of the fixing device 150 is matched with the structure of the ribbon cable, so that the ribbon cable can be well fixed.

As a preferred embodiment, each second semicircular groove 156 is provided with a first dispensing slot 159 in which a first dispensing hole 1591 is provided, and the first semicircular groove 155 is provided with a second dispensing hole 1592. After the reinforcing members of the cable are clamped by the two second circular holes 158, glue can be added into the first dispensing slot 159 from the first glue dispensing hole 1591 to strengthen fixation of the cable reinforcing members by the two clamping plates. Meanwhile, the first semicircular groove 155 is also provided with a second dispensing hole 1592, through which glue can be dispensed, to further strengthen fixation of the cable reinforcing member by the clamping plates, so that the cable is not prone to fall off and can resist a certain tensile force after being fixed.

As a preferred embodiment, the fixing device 150 has a first outer circumferential surface 1593 circumferentially tapered toward the tail part of the fixing device 150, and the rear frame sleeve 160 has a through hole 163 circumferentially tapered toward the tail part of the rear frame sleeve 160. And a diameter of the through hole 163 decreases by a magnitude greater than that of the first outer circumferential surface 1593 for the same length. Therefore, when the cable is pulled backward, an inner side wall of the rear frame sleeve 160 is pressed against an outer side wall of the clamping plates, so that the more the cable is pulled down, the tighter the clamping is, which facilitates the reliability of the structure.

As a preferred embodiment, an adhesive heat-shrinkable sleeve 164 for securing an external cable is arranged on the tail part of the rear frame sleeve 160. The tail part of the rear frame sleeve 160 is heat-shrunk on the cable and the rear frame sleeve 160 through the adhesive heat-shrinkable sleeve 164, the adhesive heat-shrinkable sleeve 164 has a rear end tightly heat-shrunk on the cable, to further fix the cable as well as to prevent other impurities such as water or dust from permeating into the hole at the rear end of the rear frame sleeve 160, so that the dustproof and waterproof effects of the outdoor optical fiber connector of the disclosure are better. The tail sleeve 170 is sleeved on the rear end of the rear frame sleeve 160, and the outer diameter of the adhesive heat-shrinkable sleeve 164 is larger than the inner diameter of the tail sleeve 170 after the adhesive heat-shrinkable sleeve 164 is shrunk on the rear frame sleeve 160, so that the tail sleeve 170 can be fixed, and the penetration of other impurities such as water or dust can be prevented.

As a preferred embodiment, the front frame sleeve 120 is sleeved by a dust cap 190 which has a tail part with a second internal thread matched with the SC external thread 193 that is screwed into the second internal thread, and an inner wall pressed against the second waterproof ring 181. The second waterproof ring 181 is tightly clamped in the second waterproof groove 126 formed after the front frame sleeve 120 and the rear frame sleeve 160 are tightened. When the locking sleeve 192 locks the dust cap 190, the inner wall of the dust cap 190 is tightly pressed against the second waterproof ring 181 to prevent other impurities such as water or dust from penetrating from above.

As a preferred embodiment, the stop ring 140 has a third external thread 142 at the tail part of the stop ring 40, and the crimp ring 145 has a third internal thread 146 that matches with the third external thread 142, and the third external thread 142 is threaded into the third internal thread 146. The SC optical fiber connector 1 is further provided with a connection handle 194 having fixing rings 195 at both ends, wherein one of the fixing rings 195 is sleeved outside the dust cap 190 and the other one of the fixing rings 195 is sleeved outside the tail sleeve 170. The stop ring 140 and the crimp ring 145, the front frame sleeve 120 and the rear frame sleeve 160 may both be in threaded connection, which is convenient and can achieve good dustproof and waterproof effects. The fixing rings 195 at both ends of the connection handle 194 are respectively sleeved on the dust cap 190 and the tail sleeve 170 to connect the dust cap 190 with the tail sleeve 170, so that the dust cap 190 will not fall off even the dust cap 190 is taken off during use. By sleeving the locking sleeve 192 outside the rear frame sleeve 160, and sleeving the fixing ring 195 at a lower end of the connection handle 194 on the tail sleeve 170, the locking sleeve 192 can be prevented from falling downwards, so that the structure is more reliable.

As a preferred embodiment, the optical fiber adapter 3 includes an outer housing 36, which is open at both ends and has a hollow interior and is internally mounted with a fixing seat 37, a clamping seat 34 which is assembled and connected with the fixing seat 37, an insertion pin 38 which is mounted in the fixing seat 37 and the clamping seat 34, a guide seat II 39 mounted outside the clamping seat 34, and an elastic member 40 for eliminating assembly clearance, and a stop shaft sleeve 41 mounted outside the guide seat II 39. The elastic member 40 includes a precision spring 42 corresponding to the shape of the guide seat II 39, and is arranged between the fixing seat 37 and the stop shaft sleeve 41 and sleeved outside the guide seat II 39. The stop shaft sleeve 41 is provided with a hollow shaft sleeve body 43, a convex ring 44 connected with the shaft sleeve body 43, a second elastic pressing arm 45 arranged on a side surface of the shaft sleeve body 43, and a second elastic pressing buckle 46 arranged on the second elastic pressing arm 45 and facing the outer housing 36.

As a preferred embodiment, the outer housing 36 is internally provided with a blind hole I 47 and a blind hole II 48 respectively at two open ends, a through hole I 49 between the blind hole I 47 and the blind hole II 48, and a mounting position I 50 formed between the blind hole II 48 and the through hole I 49 for mounting the fixing seat 37. The blind hole I 47 is provided with an internal thread I 51, and the blind hole II 48 is provided with a lead-in groove 52 which is communicated with the mounting position I 50 and facilitates mounting of the fixing seat 37, an inner boss I 53 for limiting the elastic member 40, an outer boss I 54 for mounting the stop shaft sleeve 41, a limiting position 55 and a buckle hole 56 for mounting the stop shaft sleeve 41. The mounting position I 50 is provided with a limiting groove I 57 for limiting the mounting position of the fixing seat 37, and a fool-proof position 58 for limiting the mounting direction of the fixing seat 37.

As a preferred embodiment, the outer housing 36 is provided at an outer side with an external thread I 59 and a flange structure 60. A fixing member 61 is arranged outside the outer housing, which includes a fixing nut 62 corresponding to the external thread I 59, and an O-ring 63 is arranged at one side of the flange structure 60 facing the fixing member 61. And a locking frame II 64 is further arranged outside the outer housing 36 and at the open end of the blind hole I 47, the shaft sleeve body 43 is internally provided with a clearance III 65, and a reinforcing rib 66 is arranged at one side of the second elastic pressing arm 45 facing the clearance III 65.

As a preferred embodiment, the fixing seat 37 is provided with a body I 67, a guide seat I 68 connected to one side of the body I 67, a mounting position II 69 arranged on the other side of the body I 67 for mounting the clamping seat 34, a mounting position III 70 for mounting the guide seat II 39, a through hole III 71 in the center of the body I 67, and a fool-proof position 58. The guide seat I 68 is provided with a pin seat I 73 with a pin hole I 72, and a chamfer I 74 at an inner side of the guide seat I 68. The pin hole I 72 is communicated with the through hole I 49, and has a diameter smaller than that of the through hole I 49.

As a preferred embodiment, a fixing block I 75 and a positioning groove I 76 are arranged within the mounting position II 69 for positioning the clamping seat 34, and a fixing column I 77, a positioning hole I 78 and a strip-shaped groove 79 are arranged within the mounting position III 70 for positioning the guide seat II 39.

As a preferred embodiment, the clamping seat 34 is provided with a body III 80, a pin seat II 82 arranged in the center of the body III 80 and having a pin hole II 81, a fixing block II 83, a positioning groove II 84, and an elastic pressing arm I 85 arranged outside the pin seat II 82 and having an elastic pressing buckle I 86 facing the pin seat II 82.

As a preferred embodiment, the guide seat II 39 is provided with a body IV 87, a guide frame 88 connected with the body IV 87, a mounting hole 89 arranged in the body IV 87 and used for mounting the clamping seat 34 and the guide seat II 39, and a guide hole 90 arranged in the guide frame 88 and communicated with the mounting hole 89. The guide hole 90 has an opening with a chamfer II 91, the body IV 87 and the guide frame 88 form a bearing platform 92 used for bearing the elastic member 40, the body IV 87 is provided at a lower side with a positioning hole II 93, a fixing column II 94 and a strip-shaped convex block 95, the guide frame 88 is provided with an external clearance I 96, an internal clearance II 97, and a guide groove 98 in a side wall of the guide frame 88.

As a preferred embodiment, the optical fiber adapter 3 further includes a dust cover I 99 which is arranged outside the stop shaft sleeve 41 and is capable of being sleeved with the guide seat II 39, a dust cover II 100 sleeved with the outer housing 36, and a connection handle II 102 for connecting the dust cover II 100 with the outer housing 36 and having fixing rings II 101 at both ends. The dust cover II 100 is provided with a dust cap II 103 at an end, an external thread II 104 capable of being in threaded connection with the outer housing 36, a locking frame I 105 arranged between the external thread II 104 and the dust cap II 103, and a waterproof groove I 106 arranged at a front end of the external thread II 104. A waterproof ring I 107 is arranged in the waterproof groove I 106, and one of the fixing rings II 101 of the connection handle II 102 is sleeved in the locking frame I 105. The elastic member 40 has a circular or elliptical cross-section.

During application, the SC optical fiber connector 1 is inserted into the pin seat I 73 from the blind hole I 47, and the LC optical fiber connector 2 is inserted into the pin seat II 82 from the guide seat II 39, so that conversion of signals in different modes can be completed. The optical fiber adapter 3 can realize conversion between optical fiber signals in different modes, and different colors may be adopted for the fixing seat I 37 and the guide seat II 39 to distinguish optical fiber connectors in different modes for opposite insertion.

In the optical fiber adapter 3 of the disclosure, the guide seat I 68 and the guide seat II 39 provide limit support for the optical fiber connectors during opposite insertion, so that the optical fiber connectors can be inserted into the optical fiber adapter 3 with high precision. During mounting, the pin 38 is mounted in the pin seat I 73 and the pin seat II 82 to mount the clamping seat 34 and the guide seat II 39 on the fixing seat I 37, and the clamping seat 34 and the guide seat II 39 are then welded together through ultrasonic waves to form a semi-finished product, which is mounted in the mounting position I 50, the elastic member 40 is sleeved outside the guide frame 88, and finally the stop shaft sleeve 41 is snap-fitted with the outer housing 36 to complete the assembly.

The elastic member 40 is arranged between the fixing seat I 37 and the stop shaft sleeve 41 and is sleeved outside the guide seat II 39, and the stop shaft sleeve 41 is snap-fitted with the outer housing 36. The arrangement of the elastic member 40 can guarantee the position degree of the fixing seat I 37, the clamping seat 34 and the guide seat between the outer housing 36 and the stop shaft sleeve 41, but also enables the stop shaft sleeve 41 to provide a buffering space in the outer housing 36, to facilitate the mounting of the optical fiber adapter 3. Furthermore, the precision of opposite insertion between the optical fiber connectors and the optical fiber adapter 3 can be guaranteed, thereby reducing the loss of signal conversion.

In the optical fiber adapter 3 of the disclosure, the fixing seat I 37, the clamping seat 34, the guide seat II 39, the stop shaft sleeve 41 and the guide seat II 39 are unstable with respect to position due to the assembly gap required by assembly, and reaction force acted on the stop shaft sleeve 41 and the guide seat II 39 in the up-down direction by the elastic member 40 can eliminate the influence of the assembly gap on the assembly precision, so that high assembly precision requirement is guaranteed.

Above are only the preferred embodiments of the disclosure, and technical solutions for achieving the objectives of the disclosure by substantially the same means shall all fall within the scope of the disclosure.

What is claimed is:

1. An outdoor optical fiber connection assembly, comprising an SC optical fiber connector (1), an LC optical fiber connector (2), and an optical fiber adapter (3) for communicatively connecting the SC optical fiber connector (1) with the LC optical fiber connector (2), wherein:
   the optical fiber adapter (3) is provided at opposite ends respectively with an SC connecting end (31) and an LC connecting end (32) which are correspondingly connected with the SC optical fiber connector (1) and the LC optical fiber connector (2);
   the SC optical fiber connector (1) is provided with an internal insertion channel (11) for inserting and mounting an optical cable, a ferrule assembly (131) for communication with the optical cable at one end of the SC optical fiber connector (1), a white inner core (130) arranged on a periphery of the ferrule assembly (131) for inserting into and circumferentially positioning the SC connecting end (31), and a locking sleeve (192) on a periphery of the SC optical fiber connector (1) which is configured for removable connection with the optical fiber adapter (3) and has one end with an SC external thread (193);
   the SC connecting end (31) of the optical fiber adapter (3) is provided with a first through hole which is configured for insertion of the ferrule assembly (131) and communication of the SC connecting end (31) with the LC connecting end (32), a clamping seat (34) for snap-fit connection with and circumferential positioning the white inner core (130), and an SC internal thread matched with the SC external thread (193), wherein a square positioning structure is adopted for the white inner core (130) and the clamping seat (34).

2. The outdoor optical fiber connection assembly of claim 1, wherein the SC optical fiber connector (1) is further provided with:
   a front frame sleeve (120), within which the white inner core (130) is mounted, arranged on a periphery of the SC connecting end (31), the ferrule assembly (131) having a head for insertion into the white inner core (130);
   a spring (133) arranged on a tail part of the ferrule assembly (131);
   a small white tube (134) arranged in the spring (133) for telescopic guide on the spring (133);
   a stop ring (140) arranged on a tail part of the spring (133);
   a crimp ring (145) sleeved on a tail part of the stop ring (140);
   a fixing device (150) arranged on a tail part of the crimp ring (145);
   a rear frame sleeve (160) sleeved on a tail part of the fixing device (150), the rear frame sleeve (160) extending to be connected with the front frame sleeve (120), and the locking sleeve (192) movably sleeved from a tail part of the rear frame sleeve (160); and
   a tail sleeve (170) into which a tail part of the locking sleeve (192) extends, the locking sleeve (192) being capable of rotating around an outer wall of the tail sleeve (170).

3. The outdoor optical fiber connection assembly of claim 2, wherein:
   the ferrule assembly (131) is provided with a first convex ring (132) at an outer side of the ferrule assembly (131), against which a front end of the spring (133) abuts; the stop ring (140) is internally provided with a first retaining ring (141), against which a rear end of the spring (133) abuts.

4. The outdoor optical fiber connection assembly of claim 2, wherein:
   the SC optical fiber connector (1) is further provided with a first waterproof ring (180) and a second waterproof ring (181);
   the front frame sleeve (120) and the rear frame sleeve (160) are respectively provided with a first external thread (122) and a first internal thread (161) for threaded connection;
   the front frame sleeve (120) is provided with a first waterproof groove (125), into which the first waterproof ring (180) is inserted, arranged at an inner side edge of the first external thread (122), the first waterproof ring (180) is pressed in the first internal thread (161) of the rear frame sleeve (160);
   a front end of the rear frame sleeve (160) and the front frame sleeve (120) together form a second waterproof groove (126) into which the second waterproof ring (181) is inserted.

5. The outdoor optical fiber connection assembly of claim 2, wherein:
   the front frame sleeve (120) is opened with a first mounting hole (121) within which a first convex point (123) and a second convex point (124) with different sizes are arranged;
   the stop ring (140) is provided at an outer side with a second convex ring (143) which is provided with a first clamping groove (1431) matched with the first convex point (123) and a second clamping groove (1432) matched with the second convex point (124);
   the stop ring (140) is clamped in the first mounting hole (121) by clamping the first convex point (123) in the first clamping groove (1431) and clamping the second convex point (124) in the second clamping groove (1432).

6. The outdoor optical fiber connection assembly of claim 2, wherein:
   the ferrule assembly (131), the spring (133), and the small white tube (134) are fitted into a first cavity formed by snap-fit of the stop ring (140) with the white inner core (130), and
   the white inner core (130), the ferrule assembly (131), the spring (133), the small white tube (134), and the stop ring (140), the crimp ring (145) and the fixing device (150) are disposed within a second cavity formed by the front frame sleeve (120) and the rear frame sleeve (160).

7. The outdoor optical fiber connection assembly of claim 2, wherein:
the fixing device (150) is a fixing cylinder (151) sleeved on a tail part of the crimp ring (145), and the tail sleeve (170) has a circular inner hole.

8. The outdoor optical fiber connection assembly of claim 7, wherein:
the crimp ring (145) is provided with an aluminum ring (147) outside the tail part of the crimp ring (145).

9. The outdoor optical fiber connection assembly of claim 7, wherein:
the fixing device (150) comprises two oppositely arranged fixing clamping plates (152) each being provided at an inner side with a third clamping groove (153) and a first positioning column (154), the first positioning column (154) of one of the clamping plates is clamped into the third clamping groove (153) of the other one of the clamping plates;
each of the clamping plates is provided at the inner side with a first semicircular groove (155), and a second semicircular groove (156) with a smaller radius than that of the first semicircular groove (155) at both sides of the first semicircular groove (155), the two first semicircular grooves (155) form a first circular hole (157) and two pairs of the second semicircular grooves (156) form two second circular holes (158), when the two clamping plates are fixed;
the tail sleeve (170) has an inner ribbon hole.

10. The outdoor optical fiber connection assembly of claim 9, wherein:
each second semicircular groove (156) is provided with a first dispensing slot (159) in which a first dispensing hole (1591) is provided, and the first semicircular groove (155) is provided with a second dispensing hole (1592).

11. The outdoor optical fiber connection assembly of claim 10, wherein:
the fixing device (150) has a first outer circumferential surface (1593) circumferentially tapered toward the tail part of the fixing device (150), the rear frame sleeve (160) has a through hole (163) circumferentially tapered toward the tail part of the rear frame sleeve (160), and a diameter of the through hole (163) decreases by a magnitude greater than that of the first outer circumferential surface (1593) for the same length.

12. The outdoor optical fiber connection assembly of claim 7, wherein:
an adhesive heat-shrinkable sleeve (164) is arranged on the tail part of the rear frame sleeve (160) for securing an external cable.

13. The outdoor optical fiber connection assembly of claim 4, wherein:
the front frame sleeve (120) is sleeved by a dust cap (190) which has a tail part with a second internal thread matched with the SC external thread (193) that is screwed into the second internal thread, and an inner wall pressed against the second waterproof ring (181).

14. The outdoor optical fiber connection assembly of claim 13, wherein:
the stop ring (140) has a third external thread (142) at the tail part of the stop ring (40), and the crimp ring (145) has a third internal thread (146) that matches with the third external thread (142), and the third external thread (142) is threaded into the third internal thread (146);
the SC optical fiber connector (1) is further provided with a connection handle (194) having fixing rings (195) at both ends, one of the fixing rings (195) is sleeved outside the dust cap (190) and the other one of the fixing rings (195) is sleeved outside the tail sleeve (170).

15. The outdoor optical fiber connection assembly of claim 1, wherein:
the optical fiber adapter (3) comprises an outer housing (36) which is open at both ends and has a hollow interior, the outer housing (36) is internally mounted with a fixing seat (37), the clamping seat (34) which is assembled and connected with the fixing seat (37), an insertion pin (38) which is mounted in the fixing seat (37) and the clamping seat (34), a guide seat II (39) mounted outside the clamping seat (34), and an elastic member (40) for eliminating assembly clearance, and a stop shaft sleeve (41) mounted outside the guide seat II (39).

16. The outdoor optical fiber connection assembly of claim 15, wherein:
the elastic member (40) comprises a precision spring (42) corresponding to the shape of the guide seat II (39), and is arranged between the fixing seat (37) and the stop shaft sleeve (41) and sleeved outside the guide seat II (39);
the stop shaft sleeve (41) is provided with a hollow shaft sleeve body (43), a convex ring (44) connected with the shaft sleeve body (43), a second elastic pressing arm (45) arranged on a side surface of the shaft sleeve body (43), and a second elastic pressing buckle (46) arranged on the second elastic pressing arm (45) and facing the outer housing (36).

17. The outdoor optical fiber connection assembly of claim 16, wherein:
the outer housing (36) is internally provided with a blind hole I (47) and a blind hole II (48) respectively at two open ends, a through hole I (49) between the blind hole I (47) and the blind hole II (48), and a mounting position I (50) formed between the blind hole II (48) and the through hole I (49) for mounting the fixing seat (37);
the blind hole I (47) is provided with an internal thread I (51);
the blind hole II (48) is provided with a lead-in groove (52) which is communicated with the mounting position I (50) and facilitates mounting of the fixing seat (37), an inner boss I (53) for limiting the elastic member 40, an outer boss I (54) for mounting the stop shaft sleeve (41), a limiting position (55) and a buckle hole (56) for mounting the stop shaft sleeve (41);
the mounting position I (50) is provided with a limiting groove I (57) for limiting the mounting position of the fixing seat (37), and a fool-proof position (58) for limiting the mounting direction of the fixing seat (37).

18. The outdoor optical fiber connection assembly of claim 17, wherein:
the outer housing (36) is provided at an outer side with an external thread I (59) and a flange structure (60);
a fixing member (61) is arranged outside the outer housing (36), which includes a fixing nut (62) corresponding to the external thread I (59); and
an O-ring (63) is arranged at one side of the flange structure (60) facing the fixing member (61).

19. The outdoor optical fiber connection assembly of claim 17, wherein:
a locking frame II (64) is further arranged outside the outer housing (36) and at the open end of the blind hole I (47);

the shaft sleeve body (43) is internally provided with a clearance III (65), and a reinforcing rib (66) is arranged at one side of the second elastic pressing arm (45) facing the clearance III (65).

20. The outdoor optical fiber connection assembly of claim 16, wherein:

the fixing seat (37) is provided with a body I (67), a guide seat I (68) connected to one side of the body I (67), a mounting position II (69) arranged on the other side of the body I (67) for mounting the clamping seat (34), a mounting position III (70) for mounting the guide seat II (39), a through hole III (71) in the center of the body I (67), and a fool-proof position (58); the guide seat I (68) is provided with a pin seat I (73) with a pin hole I (72), and a chamfer I (74) at an inner side of the guide seat I (68); the pin hole I (72) is communicated with the through hole I (49) and has a diameter smaller than that of the through hole I (49);

a fixing block I (75) and a positioning groove I (76) are arranged within the mounting position II (69) for positioning the clamping seat (34), and a fixing column I (77), a positioning hole I (78) and a strip-shaped groove (79) are arranged within the mounting position III (70) for positioning the guide seat II (39);

the clamping seat (34) is provided with a body III (80), a pin seat II (82) arranged in the center of the body III (80) and having a pin hole II (81), a fixing block II (83), a positioning groove II (84), and an elastic pressing arm I (85) arranged outside the pin seat II (82) and having an elastic pressing buckle I (86) facing the pin seat II (82);

the guide seat II (39) is provided with a body IV (87), a guide frame (88) connected with the body IV (87), a mounting hole (89) arranged in the body IV (87) and used for mounting the clamping seat (34) and the guide seat II (39), and a guide hole (90) arranged in the guide frame (88) and communicated with the mounting hole (89); the guide hole (90) has an opening with a chamfer II (91), the body IV (87) and the guide frame (88) form a bearing platform (92) used for bearing the elastic member (40), the body IV (87) is provided at a lower side with a positioning hole II (93), a fixing column II (94) and a strip-shaped convex block (95), the guide frame (88) is provided with an external clearance I (96), an internal clearance II (97), and a guide groove (98) in a side wall of the guide frame (88);

the optical fiber adapter (3) further comprises a dust cover I (99) which is arranged outside the stop shaft sleeve (41) and is capable of being sleeved with the guide seat II (39), a dust cover II (100) sleeved with the outer housing (36), and a connection handle II (102) for connecting the dust cover II (100) with the outer housing (36) and having fixing rings II (101) at both ends; the dust cover II (100) is provided with a dust cap II (103) at an end, an external thread II (104) capable of being in threaded connection with the outer housing (36), a locking frame I (105) arranged between the external thread II (104) and the dust cap II (103), and a waterproof groove I (106) arranged at a front end of the external thread II (104); a waterproof ring I (107) is arranged in the waterproof groove I (106), and one of the fixing rings II (101) of the connection handle II (102) is sleeved in the locking frame I (105); the elastic member (40) has a circular or elliptical cross-section.

\* \* \* \* \*